(12) United States Patent
Akiyama et al.

(10) Patent No.: US 11,230,180 B2
(45) Date of Patent: Jan. 25, 2022

(54) TRANSFER UNIT FOR A MOTOR VEHICLE

(71) Applicant: TOYOTA JIDOSHA KABUSHIKI KAISHA, Aichi-ken (JP)

(72) Inventors: Yosuke Akiyama, Susono (JP); Yohei Habata, Susono (JP); Hideaki Komada, Gotemba (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/135,728

(22) Filed: Dec. 28, 2020

(65) Prior Publication Data

US 2021/0260982 A1  Aug. 26, 2021

(30) Foreign Application Priority Data

Feb. 20, 2020  (JP) .............................. JP2020-027576

(51) Int. Cl.
*B60K 6/365* (2007.10)
*B60K 17/346* (2006.01)
*F16H 3/62* (2006.01)
*B60K 6/52* (2007.10)

(52) U.S. Cl.
CPC ............... *B60K 6/365* (2013.01); *B60K 6/52* (2013.01); *B60K 17/346* (2013.01); *F16H 3/62* (2013.01); *B60Y 2200/92* (2013.01); *F16H 2200/0017* (2013.01); *F16H 2200/2005* (2013.01); *F16H 2200/2035* (2013.01); *F16H 2200/2038* (2013.01)

(58) Field of Classification Search
CPC ........ B60K 6/20–547; B60K 17/00–36; F16H 2200/2007–2017; F16H 2200/2064; F16H 2200/2094
See application file for complete search history.

(56) References Cited

U.S. PATENT DOCUMENTS 7,631,719 B2 * 12/2009 Wenthen ................ B60K 6/365
                                                                180/243
8,888,638 B2 * 11/2014 Mueller ................ B60W 10/02
                                                                475/5

FOREIGN PATENT DOCUMENTS

WO       2010141682 A1    12/2010

* cited by examiner

*Primary Examiner* — Ernesto A Suarez
*Assistant Examiner* — Lillian T Nguyen
(74) *Attorney, Agent, or Firm* — Hauptman Ham, LLP

(57) ABSTRACT

A transfer includes: an input shaft; a motor; first and second output shafts; first and second planetary gear devices; an input switching unit; a transmission switching unit; and a distribution switching unit. Further, connection states of the input shaft, the first and the second planetary gear devices, the first and the second output shafts can be switched to a plurality of modes including first, second, and third modes by the input switching unit, the transmission switching unit, and the distribution switching unit.

13 Claims, 12 Drawing Sheets

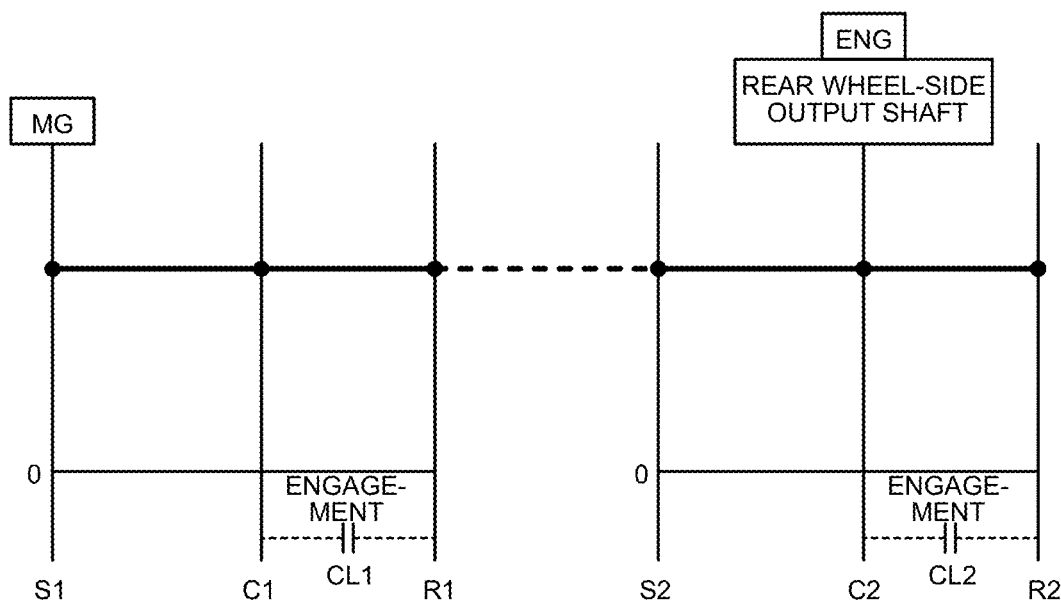
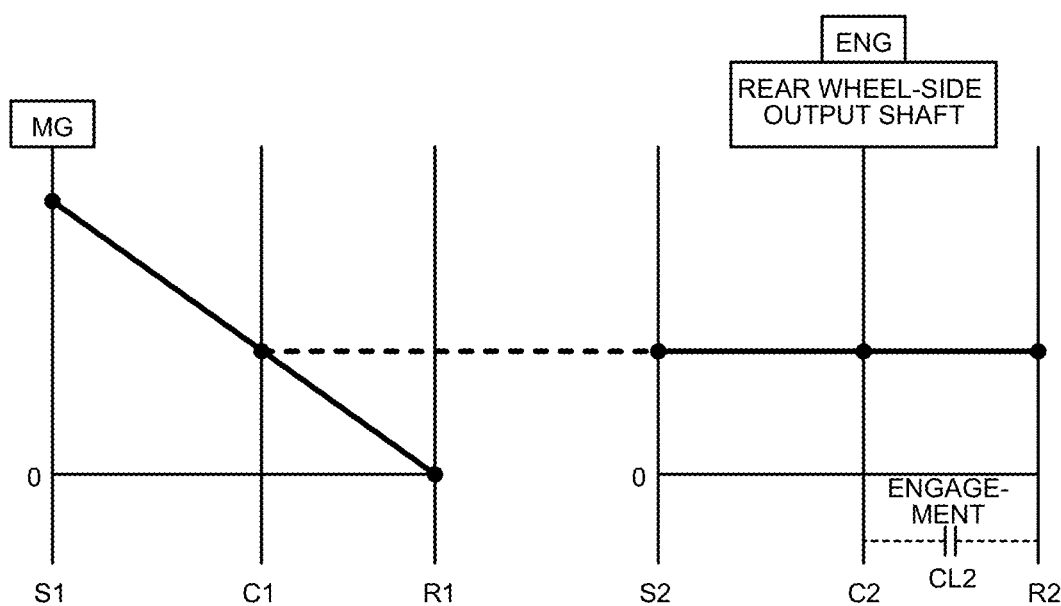

TRANSFER UNIT FOR A MOTOR VEHICLE

CROSS-REFERENCE TO RELATED APPLICATION(S)

The present application claims priority to and incorporates by reference the entire contents of Japanese Patent Application No. 2020-027576 filed in Japan on Feb. 20, 2020.

BACKGROUND

The present disclosure relates to a transfer.

As a power transmission device mounted on a four-wheel-drive vehicle, a transfer to distribute and transmit power from an engine to front wheels and rear wheels has been known. The transfer has a front wheel-side output member to transmit power to the front wheels, and a rear wheel-side output member to transmit power to the rear wheels, and can establish a two-wheel driving state in which power is output from only one output member and a four-wheel driving state in which power is output from both of the output members.

Also, in a transfer case, the transfer includes a planetary gear device as a transmission unit that outputs a rotation of the engine while changing a speed thereof. With respect to three rotational elements included in this planetary gear device, a rotational element to which the power of the engine is input and a rotational element fixed to the transfer case (fixing member) are different rotational elements. Then, the transfer can be switched between a state in which a rotation of the engine is output with a speed thereof not being changed, and a state in which the rotation of the engine is output with the speed thereof being changed by the planetary gear device.

International Publication No. WO 2010/141682 discloses a transfer including a motor functioning as a power source inside a transfer case. In this transfer, when power of an engine is transmitted to drive wheels, power of the motor can be transmitted to the drive wheels via a planetary gear device.

SUMMARY

There is a need for providing a transfer capable of transmitting power from a motor to drive wheels via a planetary gear device in a state in which one rotational element is fixed to a fixing member.

A transfer includes: an input shaft that inputs power from a first power source; a motor that functions as a second power source; a first output shaft that transmits power to main drive wheels; a second output shaft that transmits power to auxiliary drive wheels; a first planetary gear device having a first rotational element coupled to the motor, a second rotational element, and a third rotational element; a second planetary gear device having a fourth rotational element coupled to the second rotational element, a fifth rotational element, and a sixth rotational element; an input switching unit that selectively switches a connection destination of the input shaft; a transmission switching unit that switches a speed-changing state in which a rotation of the first rotational element is output with a speed thereof being changed by the first planetary gear device, and a non-speed-changing state in which a rotation of the first rotational element is output with a speed thereof not being changed by the first planetary gear device; and a distribution switching unit that switches a distribution state in which power is transmitted to the first output shaft and the second output shaft, and a non-distribution state in which power is transmitted only to the first output shaft between the first output shaft and the second output shaft. Further, connection states of the input shaft, the first planetary gear device, the second planetary gear device, the first output shaft, and the second output shaft can be switched to a plurality of modes by the input switching unit, the transmission switching unit, and the distribution switching unit, and the plurality of modes includes a first mode in which the input shaft is in a state of being directly coupled to the first output shaft and the distribution switching unit is in the non-distribution state, a second mode in which the input shaft is in a state of being directly coupled to the first output shaft, the distribution switching unit is in the distribution state, and the three rotational elements in the second planetary gear device can make differential motions in a state of being respectively coupled to the motor, the first output shaft, and the second output shaft, and a third mode in which the input shaft is in a state of being coupled to the first rotational element of the first planetary gear device, the distribution switching unit is in the distribution state, the transmission switching unit is in the speed-changing state in which the third rotational elements are fixed to a fixing member, and the three rotational elements are integrally rotatable in the second planetary gear device in a state in which two rotational elements are coupled to each other and any one of the rotational elements is coupled to the first output shaft.

BRIEF DESCRIPTION OF THE DRAWINGS

FIG. 3 is a collinear diagram illustrating a relative rotational speed relationship among rotational elements in each planetary gear device in the first driving state;

FIG. 4 is a collinear diagram illustrating a relative rotational speed relationship among the rotational elements in each planetary gear device in a second driving state;

DETAILED DESCRIPTION

In the related art, in a configuration described in International Publication No. WO 2010/141682, a rotational element fixed to a fixing member and a rotational element, to which power of a motor is input, among three rotational elements included in a planetary gear device are the same rotational element. Thus, when the power of the motor is transmitted to drive wheels via the planetary gear device, the planetary gear device cannot function as a transmission unit in a state in which one rotational element is fixed. Also, in a case where one rotational element is fixed and the planetary gear device is made to function as a transmission unit, the power of the motor cannot be transmitted to the drive wheels via the planetary gear device.

In the following, a transfer in an embodiment of the present disclosure will be described in detail with reference to the drawings. Note that the present disclosure is not limited to embodiments described in the following.

Figure 1:
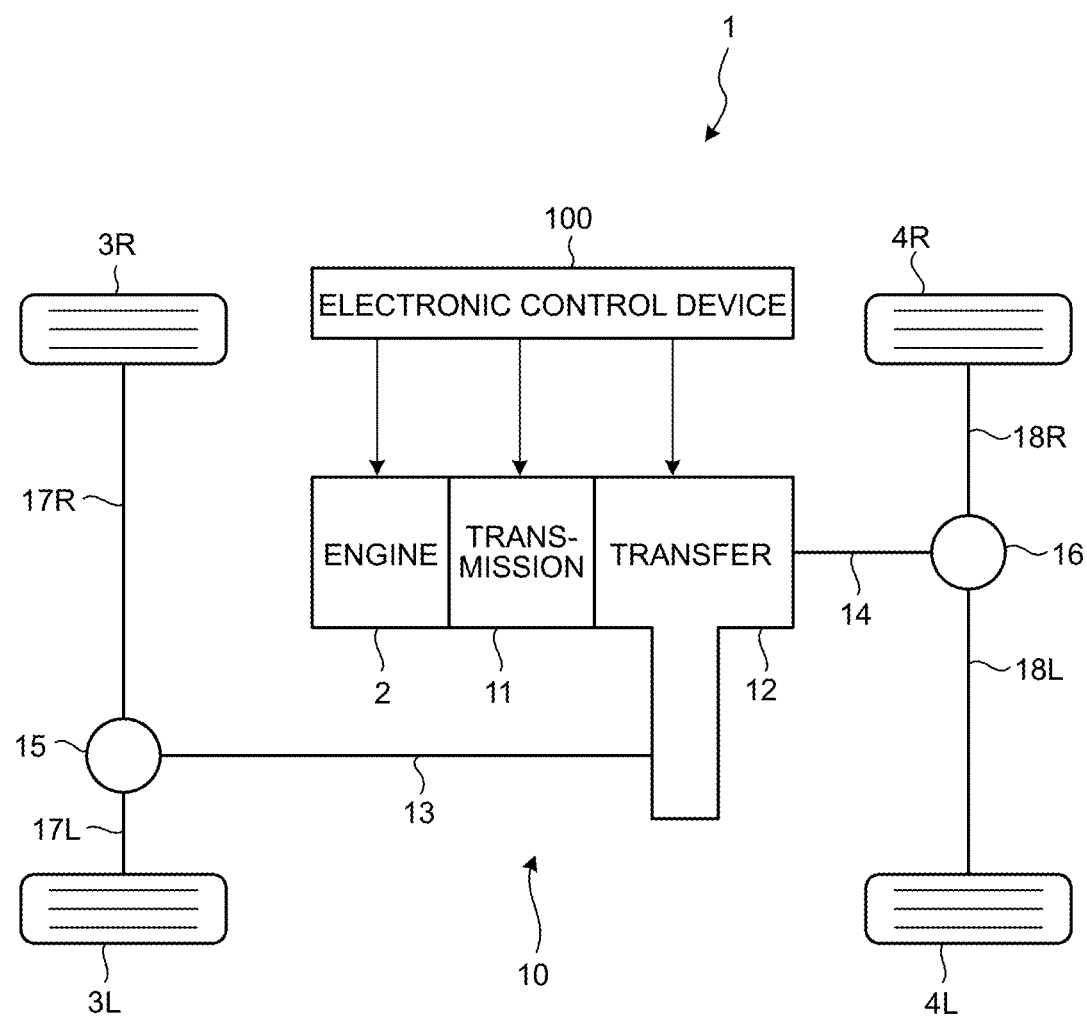
FIG. 1 is a skeleton diagram schematically illustrating a vehicle equipped with a transfer according to a first embodiment.

FIG. 1 is a skeleton diagram schematically illustrating a vehicle equipped with a transfer according to a first embodiment. A vehicle 1 includes an engine 2 as a power source, left and right front wheels 3L and 3R, left and right rear wheels 4L and 4R, and a power transmission device 10 to respectively transmit power of the engine 2 to front wheels 3 and rear wheels 4. This vehicle 1 is a four-wheel-drive vehicle based on front-engine rear-wheel drive. The rear wheels 4 are main drive wheels that become drive wheels during traveling in a two-wheel driving state and during traveling in a four-wheel driving state. On the one hand, the front wheels 3 are auxiliary drive wheels that become driven wheels during traveling in the two-wheel driving state and that become drive wheels during traveling in the four-wheel driving state.

The power transmission device 10 includes a transmission 11 coupled to the engine 2, a transfer 12 that is a front/rear wheel power distribution device coupled to the transmission 11, a front propeller shaft 13 and rear propeller shaft 14 that are respectively coupled to the transfer 12, a front-wheel differential gear mechanism 15 coupled to the front propeller shaft 13, a rear-wheel differential gear mechanism 16 coupled to the rear propeller shaft 14, left and right front wheel axles 17L and 17R coupled to the front-wheel differential gear mechanism 15, and left and right rear wheel axles 18L and 18R coupled to the rear-wheel differential gear mechanism 16. Note that wheels and axles are described as front wheels 3, rear wheels 4, front wheel axles 17, and rear wheel axles 18 with the reference signs L and R being omitted in a case where the left and right thereof are not specifically distinguished.

The power output from the engine 2 is transmitted to the transfer 12 via the transmission 11. Then, the power transmitted to the transfer 12 is transmitted from the transfer 12 to the rear wheels 4 serially through a rear wheel-side power transmission path of the rear propeller shaft 14, the rear-wheel differential gear mechanism 16, and the rear wheel axles 18. Also, a part of the power transmitted to a side of the rear wheels 4 is distributed to a side of the front wheels 3 by the transfer 12, and is transmitted to the front wheels 3 serially through a front wheel-side power transmission path of the front propeller shaft 13, the front-wheel differential gear mechanism 15, and the front wheel axles 17.

Figure 2:
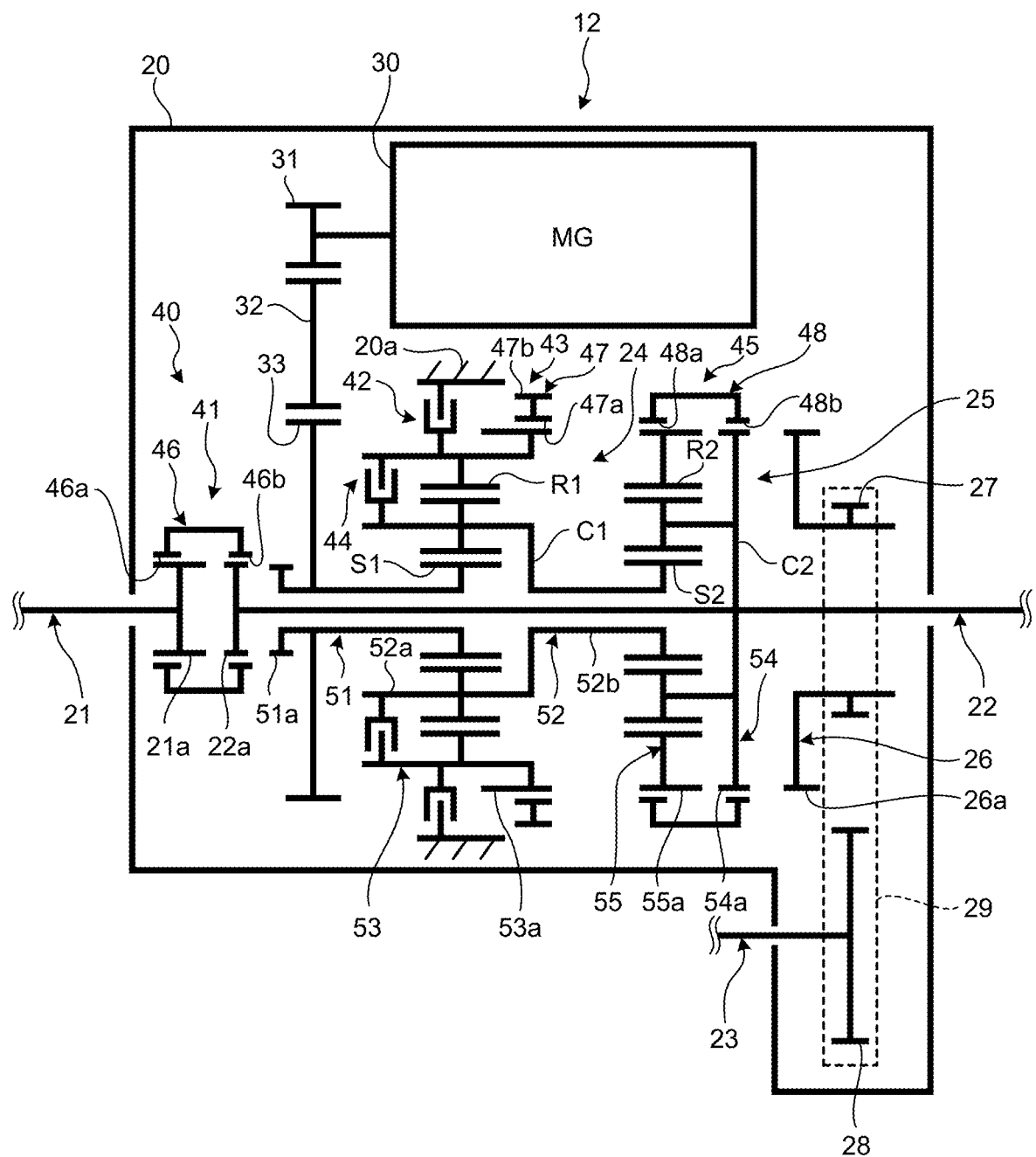
FIG. 2 is a skeleton diagram illustrating a case where the transfer in the first embodiment is in a first driving state.

As illustrated in FIG. 2, the transfer 12 of the first embodiment includes a transfer case 20 that is a non-rotational member. Inside the transfer case 20, the transfer 12 includes an input shaft 21, a rear wheel-side output shaft 22 as a first output shaft to output power to the rear wheels 4 that are main drive wheels, a front wheel-side output shaft 23 as a second output shaft to output power to the front wheels 3 that are auxiliary drive wheels, a first planetary gear device 24 that functions as a transmission unit, and a second planetary gear device 25 that functions as a power distribution unit. Also, inside the transfer case 20, the transfer 12 includes, as rotational members to form a power transmission path on the side of the front wheels, a transmitting unit 26 that functions as an input member for the side of the front wheels, a drive gear 27 that outputs power to the front wheel-side output shaft 23, a driven gear 28 that is provided integrally with the front wheel-side output shaft 23, and a front-wheel drive chain 29 that couples the drive gear 27 and the driven gear 28. Furthermore, the transfer 12 includes, inside the transfer case 20, a motor 30 as a power source, and a connection switching device 40 that switches connection states of the rotational members.

The input shaft 21 is an input member that inputs power from the engine 2 into the transfer 12. For example, the input shaft 21 is spline-fitted to an output member (not illustrated) of the transmission 11. The power transmitted from the engine 2 to the input shaft 21 via the transmission 11 is input into the transfer 12. A connection destination of the input shaft 21 is selectively switched by the connection switching device 40.

The rear wheel-side output shaft 22 is an output member that outputs power to the side of the rear wheels 4. This rear wheel-side output shaft 22 is arranged on the same axis as the input shaft 21, and is coupled to the rear propeller shaft 14 in such a manner as to rotate integrally therewith. In the transfer 12, the first planetary gear device 24, the second planetary gear device 25, the transmitting unit 26, and the drive gear 27 are arranged on the same axis as the rear wheel-side output shaft 22.

The front wheel-side output shaft 23 is an output member that outputs power to the side of the front wheels 3. This front wheel-side output shaft 23 is arranged on an axis different from that of the input shaft 21 and the rear wheel-side output shaft 22, and is coupled to the front propeller shaft 13 in such a manner as to rotate integrally therewith. Also, the front wheel-side output shaft 23 is constantly connected to the drive gear 27 via the driven gear 28 and the front-wheel drive chain 29. That is, as the drive gear 27 rotates, the front wheel-side output shaft 23 rotates. The drive gear 27 is coupled to the transmitting unit 26 in such a manner as to rotate integrally therewith.

The transmitting unit 26 is a rotational member that transmits power to the front wheel-side output shaft 23. This transmitting unit 26 is arranged on the same axis as the rear wheel-side output shaft 22 and is arranged in such a manner as to be rotatable relative to the rear wheel-side output shaft 22. The transmitting unit 26 is switched by the connection switching device 40 between a connection state in which power from the power source is transmitted and a disconnection state in which the power from the power source is not transmitted.

The first planetary gear device 24 functions as a transmission unit that outputs a rotation of the engine 2 while changing a speed thereof. This first planetary gear device 24 can transmit power of the engine 2 and power of the motor 30. The first planetary gear device 24 can function as a transmission unit (engine transmission unit) that outputs a rotation of the engine 2 while changing a speed thereof when transmitting the power of the engine 2, and can function as a transmission unit (motor transmission unit) that outputs a rotation of the motor 30 while changing a speed thereof when transmitting the power of the motor 30. In the transfer 12, by causing the first planetary gear device 24 to function as a transmission unit, it is possible to establish one of a high speed-side gear position Hi and a low speed-side gear position Lo, and to transmit a rotation of the power source to a following stage while changing a speed thereof.

This first planetary gear device 24 includes a single pinion-type planetary gear device having three rotational elements. As illustrated in FIG. 2, the first planetary gear device 24 includes, as the three rotational elements, a first sun gear S1, a first ring gear R1 arranged concentrically with the first sun gear S1, and a first carrier C1 that rotatably and revolvably supports a plurality of pinion gears that meshes with the first sun gear S1 and the first ring gear R1.

The first sun gear S1 is a first rotational element that functions as an input element. A first rotational member 51 that is an input member of the first planetary gear device 24 is coupled to this first sun gear S1 in such a manner as to rotate integrally. Also, the first sun gear S1 is constantly connected to the motor 30 via the first rotational member 51 in such a manner that transmission of power can be performed. The first carrier C1 is a second rotational element that functions as an output element. A second rotational member 52 that is an output member of the first planetary gear device 24 is coupled to this first carrier C1 in such a manner as to rotate integrally. The first ring gear R1 is a third rotational element that functions as a reaction force element. A third rotational member 53 is coupled to this first ring gear R1 in such a manner as to rotate integrally.

The second planetary gear device 25 functions as a power distribution unit that distributes and transmits the power of the engine 2 to the front wheels 3 and the rear wheels 4. This second planetary gear device 25 is arranged side by side in an axial direction with the first planetary gear device 24, and is configured to receive an input of the power output from the first planetary gear device 24. The second planetary gear device 25 can transmit the power of the engine 2 and the power of the motor 30. Thus, the second planetary gear device 25 can distribute power to the front wheels 3 and the rear wheels 4 when transmitting the power of the engine 2, and can distribute power to the front wheels 3 and the rear wheels 4 when transmitting the power of the motor 30.

This second planetary gear device 25 includes a single pinion-type planetary gear device having three rotational elements. As illustrated in FIG. 2, the second planetary gear device 25 includes, as the three rotational elements, a second sun gear S2, a second ring gear R2 arranged concentrically with the second sun gear S2, and a second carrier C2 that rotatably and revolvably supports a plurality of pinion gears that meshes with the second sun gear S2 and the second ring gear R2.

The second sun gear S2 is a fourth rotational element that functions as an input element. A second rotational member 52 is coupled to this second sun gear S2 in such a manner as to rotate integrally. That is, the first carrier C1 is coupled to the second sun gear S2, and the second sun gear S2 and the first carrier C1 rotate integrally. The second carrier C2 is a fifth rotational element that functions as an output element. The rear wheel-side output shaft 22 is coupled to this second carrier C2 in such a manner as to rotate integrally. The second carrier C2 and the rear wheel-side output shaft 22 are coupled.

Furthermore, a fourth rotational member 54 is coupled to the second carrier C2 in such a manner as to rotate integrally. The second ring gear R2 is a sixth rotational element that functions as an output element. A fifth rotational member 55 is coupled to this second ring gear R2 in such a manner as to rotate integrally.

The motor 30 is a motor generator (MG) that can function as an electric motor and a generator. The motor 30 includes a rotor, a stator, and an output shaft rotating integrally with the rotor, and is electrically connected to a battery via an inverter. As illustrated in FIG. 2, a reduction gear 31 is provided on the output shaft of the motor 30. The reduction gear 31 meshes with a counter gear 32. The counter gear 32 meshes with an input gear 33. The input gear 33 is attached to the first rotational member 51 in such a manner as to rotate integrally, and is mechanically coupled to the first sun gear S1 of the first planetary gear device 24 in such a manner as to rotate integrally. Then, the reduction gear 31, the counter gear 32, and the input gear 33 form a reduction gear train. Thus, when the power output from the motor 30 is transmitted to the first sun gear S1 via this reduction gear train, a rotation of the motor 30 is transmitted with a speed thereof being changed (reduced).

The connection switching device 40 functions as an input switching unit, a transmission switching unit, and a distribution switching unit. The connection switching device 40 is a device that switches connection states of the rotational members included in the transfer 12, and switches connection states of the input shaft 21, the rear wheel-side output shaft 22, the first planetary gear device 24, the second planetary gear device 25, and the transmitting unit 26. The input switching unit selectively switches connection destinations of the input shaft 21. This input switching unit switches a direct coupling state in which the input shaft 21 is directly coupled to the rear wheel-side output shaft 22 (first input state), and a speed-changing state in which the input shaft 21 is coupled to the first sun gear S1 of the first planetary gear device 24 (second input state). That is, the input switching unit is a so-called high/low switching unit and also has a function as a transmission switching unit. The transmission switching unit switches a speed-changing state in which a rotation of the first sun gear S1 is transmitted to the rear wheel-side output shaft 22 with a speed thereof being changed, and a non-speed-changing state in which a rotation of the first sun gear S1 is transmitted to the rear wheel-side output shaft 22 with the speed thereof not being changed. The distribution switching unit switches a non-distribution state in which the power output from the power source is transmitted only to the rear wheels 4 (two-wheel driving state), and a distribution state in which the power output from the power source is distributed and transmitted to the front wheels 3 and the rear wheels 4 (four-wheel driving state).

As illustrated in FIG. 2, the connection switching device 40 includes a first dog clutch 41, a first friction clutch 42, a second dog clutch 43, a second friction clutch 44, and a third dog clutch 45.

The first dog clutch 41 is an engagement device that functions as an input switching unit and a transmission switching unit. As illustrated in FIG. 2, the first dog clutch 41 is a meshing engagement device that selectively connects the input shaft 21 to the first sun gear S1 and the rear wheel-side output shaft 22. This first dog clutch 41 is switched between a first input state in which the power of the engine 2 is transmitted to the rear wheel-side output shaft 22 without the first planetary gear device 24 (direct coupling state), and a second input state in which the power of the engine 2 is transmitted to the rear wheel-side output shaft 22 via the first planetary gear device 24 (speed-changing state). In other words, the first dog clutch 41 is switched between the direct coupling state in which a rotation of the engine 2 is transmitted to the rear wheel-side output shaft 22 with a speed thereof not being changed (first input state), and the speed-changing state in which a rotation of the engine 2 is transmitted to the rear wheel-side output shaft 22 with a speed thereof being changed (second input state).

This first dog clutch 41 has a first switching sleeve 46 as an input switching member. The first switching sleeve 46 has a first gear tooth 46a that meshes with a first gear tooth 21a of the input shaft 21, and a second gear tooth 46b that meshes with a gear tooth 22a of the rear wheel-side output shaft 22. This second gear tooth 46b can mesh with a gear tooth 51a of the first rotational member 51. The first switching sleeve 46 is moved in the axial direction by an actuator of the first dog clutch 41. Then, in a state in which the first gear tooth 46a constantly meshes with the input shaft 21, the first switching sleeve 46 is switched in such a manner that a meshing partner of the second gear tooth 46b becomes one of the rear wheel-side output shaft 22 and the first rotational member 51. The first dog clutch 41 becomes the direct coupling state (first input state) in a case where the second gear tooth 46b meshes with the rear wheel-side output shaft 22, and the first dog clutch 41 becomes the speed-changing state (second input state) in a case where the second gear tooth 46b meshes with the first rotational member 51.

The first friction clutch 42 is an engagement device that functions as a transmission switching unit. The first friction clutch 42 is a friction engagement device that is operated by a hydraulic actuator and that selectively fixes the first ring gear R1 to a fixing member 20a. The fixing member 20a is the transfer case 20 itself or a non-rotational member integrated with the transfer case 20. Also, in the first friction clutch 42, it is possible to control engagement force by controlling a hydraulic pressure.

This first friction clutch 42 has a first friction engagement element (fixed element) fixed to the fixing member 20a, and a second friction engagement element (rotational element) that rotates integrally with the first ring gear R1. For example, this first friction engagement element is spline-fitted to the fixing member 20a, and the second friction engagement element is mechanically coupled to the third rotational member 53 in such a manner as to rotate integrally therewith. Thus, when the first friction clutch 42 is engaged, the first ring gear R1 cannot rotate. On the one hand, when the first friction clutch 42 is released, the first ring gear R1 becomes rotatable.

The second dog clutch 43 is an engagement device that functions as a transmission switching unit. This second dog clutch 43 is a meshing engagement device that selectively fixes the first ring gear R1 to the fixing member 20a. The second dog clutch 43 is switched between an engaged state in which the first ring gear R1 is mechanically fixed and a released state in which the first ring gear R1 is released rotatably.

This second dog clutch 43 has a second switching sleeve 47 as a transmission switching member. The second switching sleeve 47 has a first gear tooth 47a that meshes with a gear tooth 53a of the third rotational member 53 that rotates integrally with the first ring gear R1, and a second gear tooth 47b that meshes with the fixing member 20a. The second switching sleeve 47 is moved in the axial direction by an actuator of the second dog clutch 43. Then, in a state in which the first gear tooth 47a constantly meshes with the third rotational member 53, the second switching sleeve 47 is switched between a case where the second gear tooth 47b meshes with the fixing member 20a and a case where there is no meshing thereof. In a case where the second gear tooth 47b meshes with the fixing member 20a, the second dog clutch 43 is in the engaged state. In a case where the second gear tooth 47b does not mesh with the fixing member 20a, the second dog clutch 43 is in the released state.

For example, when the first ring gear R1 is fixed to the fixing member 20a by the first friction clutch 42 and the second dog clutch 43, the first friction clutch 42 is switched from the released state to the engaged state with the second dog clutch 43 being in the released state. Then, with the first friction clutch 42 maintained in the engaged state, the second switching sleeve 47 is moved in the axial direction to switch the second dog clutch 43 from the released state to the engaged state. Then, the first friction clutch 42 can be released. Since the first ring gear R1 can be fixed by mechanical force when the second dog clutch 43 is engaged, it is not necessary to supply the hydraulic pressure for generation of the engagement force to the hydraulic actuator of the first friction clutch 42. As a result, fuel efficiency corresponding to this hydraulic pressure is improved.

The second friction clutch 44 is an engagement device that functions as a transmission switching unit. The second friction clutch 44 is a friction engagement device that is operated by the hydraulic actuator and that selectively engages the first ring gear R1 and the first carrier C1. In the second friction clutch 44, it is possible to control the engagement force by controlling the hydraulic pressure.

This second friction clutch 44 has a first friction engagement element that rotates integrally with the first carrier C1, and a second friction engagement element that rotates integrally with the first ring gear R1. For example, this first friction engagement element is spline-fitted to a cylindrical portion 52a of the second rotational member 52, and the second friction engagement element is spline-fitted to a cylindrical portion of the third rotational member 53. When the second friction clutch 44 is engaged, the first carrier C1 and the first ring gear R1 are in a state of being integrally rotatable. On the one hand, when the second friction clutch 44 is released, the first carrier C1 is in a state of being rotatable relative to the first ring gear R1. Also, the second rotational member 52 has a connection portion 52b that extends to a side of the second planetary gear device 25 and that is coupled to the second sun gear S2. Note that the cylindrical portion 52a may be a clutch drum mechanically coupled to the second rotational member 52 in such a manner as to rotate integrally therewith. Similarly, the cylindrical portion of the third rotational member 53 may be a clutch drum mechanically coupled to the third rotational member 53 in such a manner as to rotate integrally therewith.

The third dog clutch 45 is an engagement device that functions as a distribution switching unit. The third dog clutch 45 is a meshing engagement device that selectively couples the rear wheel-side output shaft 22 to the transmitting unit 26. This third dog clutch 45 is switched between a distribution state in which a part of the power transmitted to the rear wheel-side output shaft 22 is distributed to the front wheel-side output shaft 23, and a non-distribution state in which the power transmitted to the rear wheel-side output shaft 22 is not distributed to the front wheel-side output shaft 23.

This third dog clutch 45 has a third switching sleeve 48 as a distribution switching member. The third switching sleeve 48 has a first gear tooth 48a that meshes with a first gear tooth 54a of the fourth rotational member 54 and a gear tooth 55a of the fifth rotational member 55, and a second gear tooth 48b that meshes with a first gear tooth 26a of the transmitting unit 26. The third switching sleeve 48 is moved in the axial direction by an actuator of the third dog clutch 45. Then, the third switching sleeve 48 is switched among the non-distribution state, a first distribution state, and a second distribution state by selectively changing a coupling target.

In the non-distribution state, the second carrier C2 and the second ring gear R2 are not coupled to the transmitting unit 26, and the second carrier C2 and the second ring gear R2 are coupled to each other in such a manner as to be integrally rotatable. In the non-distribution state, the first gear tooth 48*a* of the third switching sleeve 48 meshes with the fourth rotational member 54, and the second gear tooth 48*b* meshes with the fifth rotational member 55 (see FIG. 2). In a case where the third switching sleeve 48 is in the non-distribution state, the transfer 12 is set to the two-wheel driving state.

The first distribution state is a state in which the second carrier C2 and the second ring gear R2 can make differential motions and the second ring gear R2 is coupled to the transmitting unit 26. In the first distribution state, the first gear tooth 48*a* of the third switching sleeve 48 meshes with the fifth rotational member 55, and the second gear tooth 48*b* meshes with the transmitting unit 26 (see FIG. 5 described later). In a case where the third switching sleeve 48 is in the first distribution state, the transfer 12 is set to the four-wheel driving state in which a differential motion between the rear wheel-side output shaft 22 and the front wheel-side output shaft 23 is allowed.

The second distribution state is a state in which the second carrier C2 and the second ring gear R2 are coupled to each other in a manner of being integrally rotatable and the second carrier C2 and the second ring gear R2 are coupled to the transmitting unit 26. In the second distribution state, the first gear tooth 48*a* of the third switching sleeve 48 meshes with the fourth rotational member 54 and the fifth rotational member 55, and the second gear tooth 48*b* meshes with the transmitting unit 26 (see FIG. 8 and FIG. 10 described later). In a case where the third switching sleeve 48 is in the second distribution state, the transfer 12 is set to the four-wheel driving state in which a differential motion between the rear wheel-side output shaft 22 and the front wheel-side output shaft 23 is limited.

In such a manner, in the distribution state, the second planetary gear device 25 and the third dog clutch 45 can be switched between a state in which the rear wheel-side output shaft 22 and the transmitting unit 26 can make differential motions (first distribution state) and a state in which the rear wheel-side output shaft 22 and the transmitting unit 26 do not make differential motions (second distribution state). That is, when being in the four-wheel driving state, the transfer 12 can be switched between a differential state in which differential motions between the rear propeller shaft 14 and the front propeller shaft 13 are not limited (first distribution state) and a non-differential state in which differential motions therebetween are limited (second distribution state).

Also, as illustrated in FIG. 1, the vehicle 1 includes an electronic control device 100 that controls the vehicle 1. The electronic control device 100 outputs a command signal to an actuator that operates the connection switching device 40, and controls the operation of the connection switching device 40. For example, the electronic control device 100 includes a microcomputer including a central processing unit (CPU), a random access memory (RAM), a read only memory (ROM), an input/output interface and the like. The CPU executes various kinds of control by performing signal processing according to a program stored in advance in the ROM while using a temporary storage function of the RAM.

Sensor signals from various sensors mounted on the vehicle 1 are input into the electronic control device 100. For example, various sensors include an engine speed sensor, a motor rotation angle sensor, a vehicle speed sensor, an accelerator position sensor, a Hi range selection switch to select a high speed-side gear position Hi by an operation by a driver, and a 4WD selection switch to select the four-wheel driving state by an operation by the driver. The electronic control device 100 executes drive control and the like of the vehicle 1 on the basis of the input sensor signals. Then, the electronic control device 100 outputs a command signal to control the engine 2, a command signal to control the transmission 11, a command signal to control the transfer 12 and the like. The command signal to control the transfer 12 includes a command signal to control the motor 30 and a command signal to control the connection switching device 40.

For example, the electronic control device 100 can control a driving state of the transfer 12 into a plurality of modes by controlling an operation of the motor 30 and controlling a connection state of the connection switching device 40. More specifically, when the electronic control device 100 executes switching control of the connection switching device 40, connection states of the rotational members included in the transfer 12 (connection states of the input shaft 21, the first planetary gear device 24, the second planetary gear device 25, the rear wheel-side output shaft 22, and the front wheel-side output shaft 23) can be switched to a plurality of modes. The plurality of modes includes a first mode, a second mode, and a third mode.

The first mode is the two-wheel driving state and is a connection state in which the third dog clutch 45 is in the non-distribution state with the input shaft 21 being in a state of directly coupled to the rear wheel-side output shaft 22. Also, in the first mode, an engine traveling mode in which the rear wheels 4 are driven only by the power of the engine 2, an HV mode in which the rear wheels 4 are driven by the power of the engine 2 and the power of the motor 30, and an EV mode in which the rear wheels 4 are driven only by the power of the motor 30 can be set.

The second mode is the four-wheel driving state, and is a connection state in which the third dog clutch 45 is in the first distribution state with the input shaft 21 being in a state of directly coupled to the rear wheel-side output shaft 22, and in which a differential motion of each rotational element of the second planetary gear device 25 is possible. The second planetary gear device 25 also has a function as a distribution switching unit. This second mode is a so-called torque split 4WD mode, and is a mode in which power distribution to the front wheels 3 and the rear wheels 4 can be operated by control of an operation of the motor 30 (front-rear distribution control mode).

The third mode is a four-wheel driving state, and is a connection state in which the third dog clutch 45 is in the second distribution state and the three rotational elements included in the second planetary gear device 25 are integrally rotatable. This third mode is a mode in which the power distribution to the front wheels 3 and the rear wheels 4 is mechanically fixed (fixed distribution mode) since the rear wheel-side output shaft 22 and the transmitting unit 26 are engaged by the third dog clutch 45 in such a manner as to rotate integrally.

Furthermore, in each of the first mode, the second mode, and the third mode, the first planetary gear device 24 can be switched between a non-speed-changing state (Hi mode) and a speed-changing state (Lo mode). In a case of the non-speed-changing state, the first planetary gear device 24 is in a mode in which the three rotational elements including the first sun gear S1, the first carrier C1, and the first ring gear R1 can be integrally rotated (Hi mode). Also, in a case of the speed-changing state, the first planetary gear device 24 is in a mode in which the first sun gear S1 and the first ring gear R1 can be rotated with the first ring gear R1 being in a fixed state (Lo mode). That is, each of the first mode, the second mode, and the third mode described above includes a case of the Hi mode and a case of the Lo mode.

Also, in the third mode, the input shaft 21 is in a state of being directly coupled to the rear wheel-side output shaft 22 in a case of the Hi mode, and the input shaft 21 is in a state of being coupled to the first sun gear S1 in a case of the Lo mode.

In such a manner, in the transfer 12, switching among a plurality of driving states can be performed by the connection switching device 40, the first planetary gear device 24, and the second planetary gear device 25. The plurality of driving states include a first driving state (Hi mode in the first mode), a second driving state (Lo mode in the first mode), a third driving state (Hi mode in the second mode), a fourth driving state (Lo mode in the second mode), a fifth driving state (Hi mode in the third mode), and a sixth driving state (Lo mode in the third mode).

Here, the first to sixth driving states will be described with reference to FIG. 2 to FIG. 11. Note that the motor 30 is described as "MG", the engine 2 is described as "ENG", the first sun gear S1 is described as "S1", the first carrier C1 is described as "C1", the first ring gear R1 is described as "R1", the second dog clutch 43 is described as "CL1", the second sun gear S2 is described as "S2", the second carrier C2 is described as "C2", the second ring gear R2 is described as "R2", and the third dog clutch 45 is described as "CL2" in FIG. 3, FIG. 4, FIG. 6, FIG. 7, FIG. 9, and FIG. 11.

First, the first driving state (case of the Hi mode in the first mode) will be described with reference to FIG. 2 and FIG. 3. In the first driving state, the first planetary gear device 24 is in the non-speed-changing state in the two-wheel driving state in which the connection switching device 40 is in the non-distribution state and the power is transmitted only to the rear wheels 4. Thus, in the first driving state, when the power of the motor 30 is transmitted to the rear wheels 4, a rotation of the motor 30 is transmitted to the rear wheel-side output shaft 22 without a speed thereof being reduced by the transfer 12 as illustrated in FIG. 3.

As illustrated in FIG. 2, in a case where the transfer 12 is in the first driving state, the first dog clutch 41 is in the direct coupling state, the second dog clutch 43 is in the non-speed-changing state, and the third dog clutch 45 is in the non-distribution state. More specifically, the first switching sleeve 46 meshes with the input shaft 21 and the rear wheel-side output shaft 22, whereby the input shaft 21 is directly coupled to the rear wheel-side output shaft 22. The second switching sleeve 47 does not mesh with the fixing member 20a. Also, when the first friction clutch 42 is released and the second friction clutch 44 is engaged, the first carrier C1 and the first ring gear R1 are coupled in such a manner as to rotate integrally in the first planetary gear device 24. When the third switching sleeve 48 meshes with the fourth rotational member 54 and the fifth rotational member 55, the second carrier C2 and the second ring gear R2 are coupled in such a manner as to rotate integrally in the second planetary gear device 25.

In such a manner, since the input shaft 21 is directly coupled to the rear wheel-side output shaft 22 in the first driving state, the power of the engine 2 is transmitted to the rear wheel-side output shaft 22 without the first planetary gear device 24 and the second planetary gear device 25. That is, a rotation of the input shaft 21 (rotation of the engine 2) is transmitted to the rear wheel-side output shaft 22 with a speed thereof not being changed. Also, although the motor 30 is constantly connected to the rear wheel-side output shaft 22 via the first planetary gear device 24 and the second planetary gear device 25, the first planetary gear device 24 and the second planetary gear device 25 are in the non-speed-changing state in the first driving state. Thus, in the first driving state, the six rotational elements included in the first planetary gear device 24 and the second planetary gear device 25 have the same rotational speed.

Next, the second driving state (case of Lo mode in the first mode) will be described with reference to FIG. 4. In the second driving state, the first planetary gear device 24 is in the speed-changing state in the two-wheel driving state in which the connection switching device 40 is in the non-distribution state and the power is transmitted only to the rear wheels 4. Thus, in the second driving state, when the power of the motor 30 is transmitted to the rear wheels 4, a rotation of the motor 30 is transmitted to the rear wheel-side output shaft 22 with a speed thereof being reduced by the first planetary gear device 24 as illustrated in FIG. 4.

In a case where the transfer 12 is in the second driving state, unlike the first driving state, the second dog clutch 43 is in the speed-changing state. That is, the second dog clutch 43 is engaged in a state in which the first friction clutch 42 is released and the second friction clutch 44 is released. Accordingly, the first ring gear R1 can be mechanically fixed in the first planetary gear device 24. Thus, power (motor torque) input into the first sun gear S1 can be output from the first carrier C1 in a state in which the three rotational elements included in the second planetary gear device 25 and the first carrier C1 have the same rotational speed.

In such a manner, rear wheel-driving can be performed by the engine 2 and the motor 30, and a speed reduction ratio of the motor 30 can be switched in the first driving state and the second driving state.

Next, the third driving state (case of Hi mode in the second mode) will be described with reference to FIG. 5 and FIG. 6. In the third driving state, the first planetary gear device 24 is in the non-speed-changing state and the second planetary gear device 25 is in a state of being able to make a differential motion in the four-wheel driving state in which the connection switching device 40 is in the first distribution state.

Figure 5:
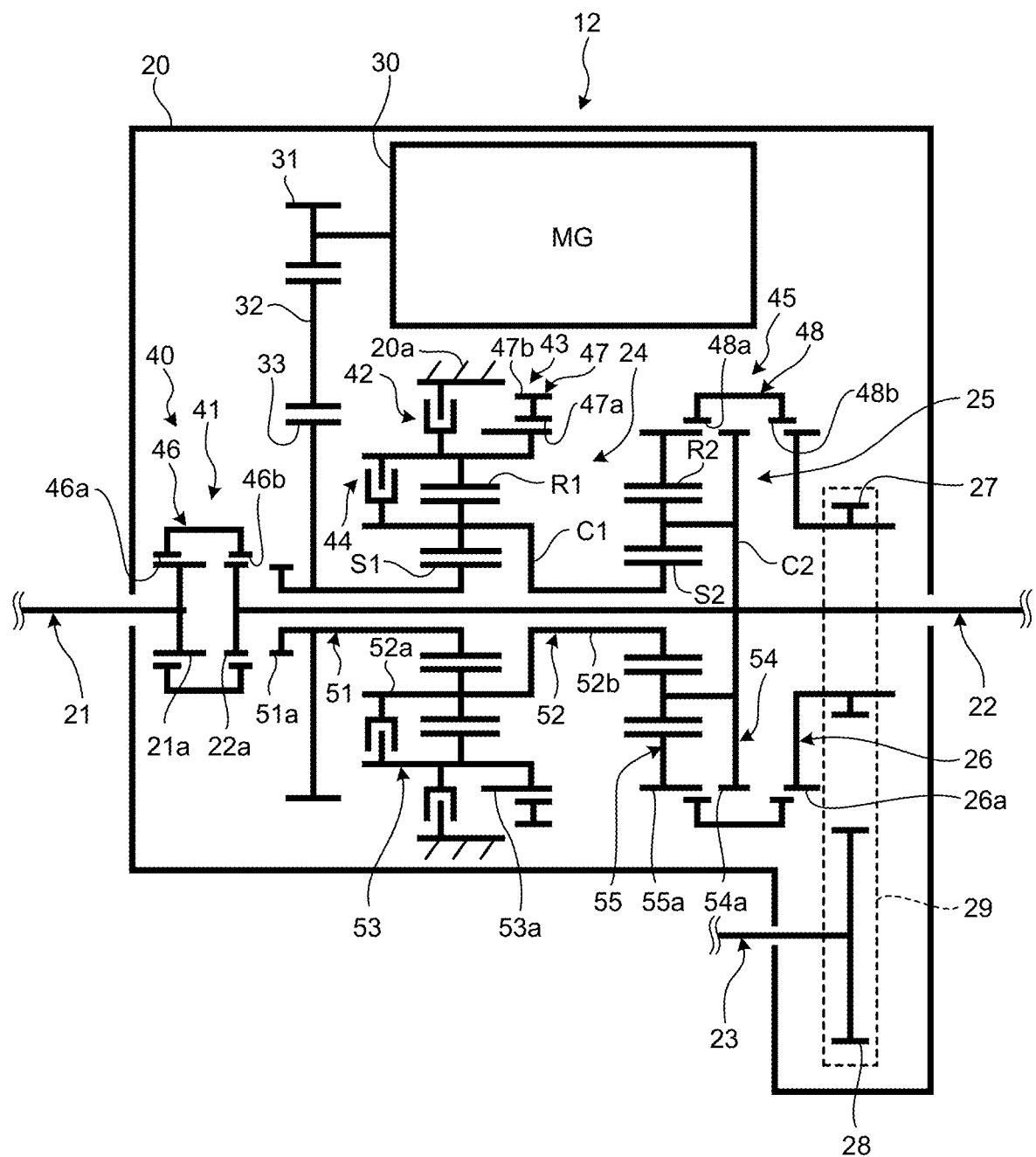
FIG. 5 is a skeleton diagram illustrating a case where the transfer in the first embodiment is in a third driving state.
Figure 6:
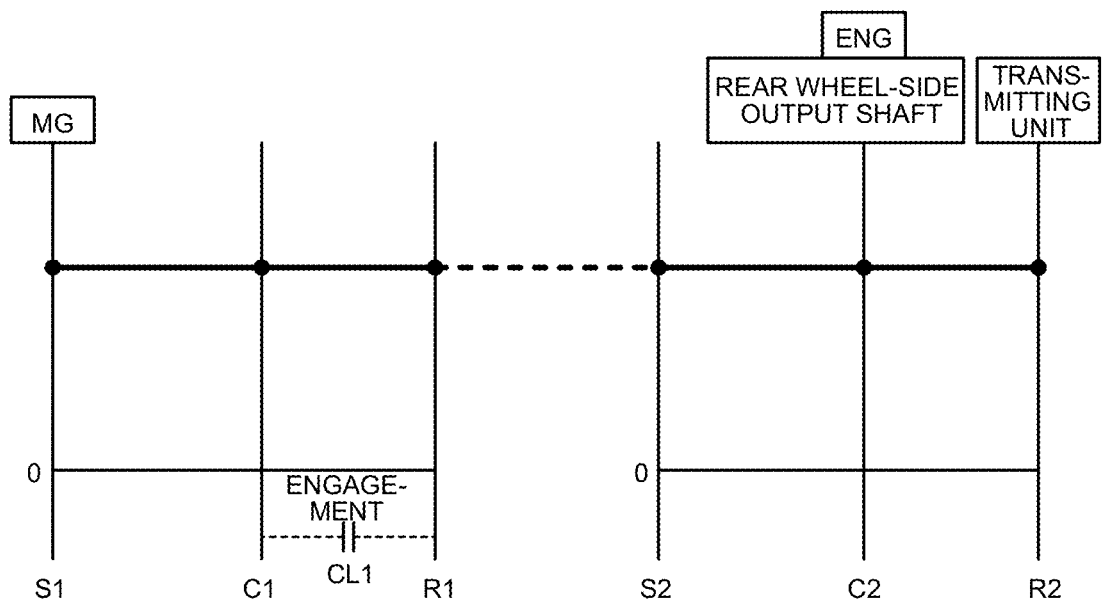
FIG. 6 is a collinear diagram illustrating a relative rotational speed relationship among the rotational elements in each planetary gear device in the third driving state.

As illustrated in FIG. 5, in a case where the transfer 12 is in the third driving state, the first dog clutch 41 is in the direct coupling state, the second dog clutch 43 is in the non-speed-changing state, and the third dog clutch 45 is in the first distribution state. More specifically, the first switching sleeve 46 meshes with the input shaft 21 and the rear wheel-side output shaft 22. The second switching sleeve 47 does not mesh with the fixing member 20a. Also, the first friction clutch 42 is released and the second friction clutch 44 is engaged. The third switching sleeve 48 meshes with the fifth rotational member 55 and the transmitting unit 26. Accordingly, the three rotational elements can rotate integrally in the first planetary gear device 24, and the second sun gear S2, the second carrier C2, and the second ring gear R2 can make differential motions in the second planetary gear device 25.

In such a manner, since the input shaft 21 is directly coupled to the rear wheel-side output shaft 22 in the third driving state, the power of the engine 2 is transmitted to the rear wheel-side output shaft 22 without the first planetary gear device 24 and the second planetary gear device 25. That is, a rotation of the input shaft 21 (rotation of the engine 2) is transmitted to the rear wheel-side output shaft 22 with a speed thereof not being changed. Also, since the second planetary gear device 25 is in a state of being able to make a differential motion, the power of the motor 30 is distributed and transmitted to the transmitting unit 26 and the rear wheel-side output shaft 22 via the first planetary gear device 24 and the second planetary gear device 25. Thus, in the third driving state, it becomes possible to control the distribution of the power transmitted to the side of the front wheels and the side of the rear wheels by torque output from the motor 30 as illustrated in FIG. 6.

Figure 7:
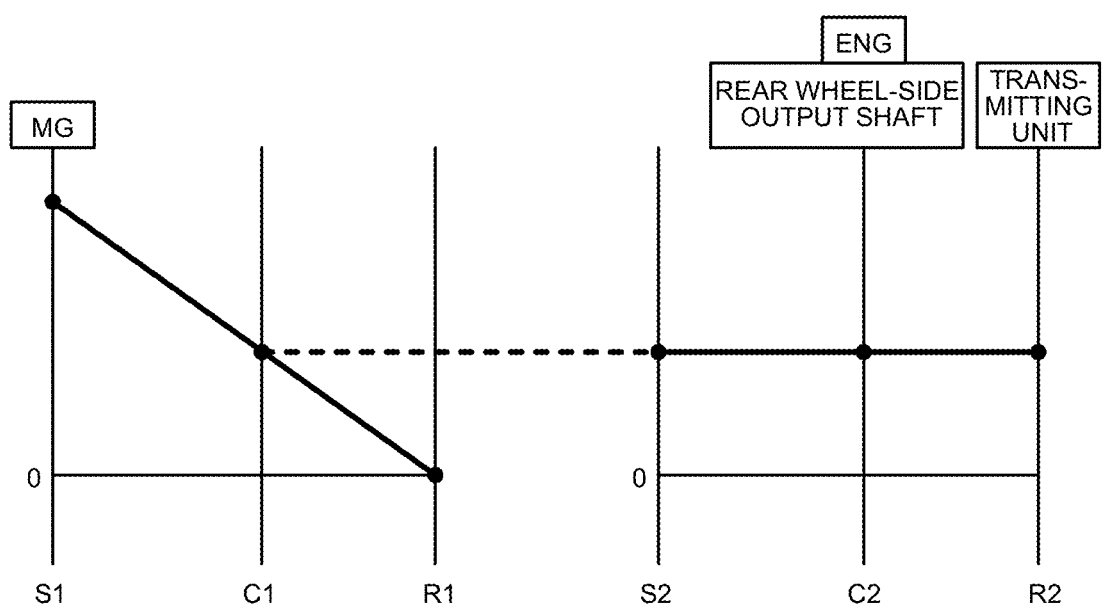
FIG. 7 is a collinear diagram illustrating a relative rotational speed relationship among the rotational elements in each planetary gear device in a fourth driving state.

Next, the fourth driving state (case of Lo mode in the second mode) will be described with reference to FIG. 7. In the fourth driving state, the first planetary gear device 24 is in the speed-changing state and the second planetary gear device 25 is in a state of being able to make a differential motion in the four-wheel driving state in which the connection switching device 40 is in the first distribution state. Thus, in the fourth driving state, when the power of the engine 2 and the power of the motor 30 are transmitted to the front wheels 3 and the rear wheels 4, a rotation of the engine 2 is transmitted to the rear wheel-side output shaft 22 with the speed thereof not being reduced by the transfer 12, and a rotation of the motor 30 is transmitted to the rear wheel-side output shaft 22 with the speed thereof being reduced by the first planetary gear device 24 as illustrated in FIG. 7. In such a manner, in a case where the transfer 12 is in the fourth driving state, unlike the third driving state, the second dog clutch 43 is engaged in a state in which the second friction clutch 44 is released. Accordingly, the first ring gear R1 can be mechanically fixed in the first planetary gear device 24. Thus, the power (motor torque) input into the first sun gear S1 can be output from the first carrier C1 in a state in which differential motions with the three rotational elements included in the second planetary gear device 25 can be made.

In such a manner, in the third driving state and the fourth driving state, front/rear distribution control can be performed, and a speed reduction ratio of the motor 30 can be switched.

Next, the fifth driving state (case of Hi mode in the third mode) will be described with reference to FIG. 8 and FIG. 9. In the fifth driving state, in the four-wheel driving state in which the connection switching device 40 is in the second distribution state, the first planetary gear device 24 is in the non-speed-changing state and the second planetary gear device 25 is in an integrally rotating state. In the fifth driving state, a fixed distribution 4WD mode in which a rotation of the engine 2 is output with a speed thereof not being reduced by the transfer 12 and a power distribution of the front and rear wheels is mechanically fixed is possible.

Figure 8:
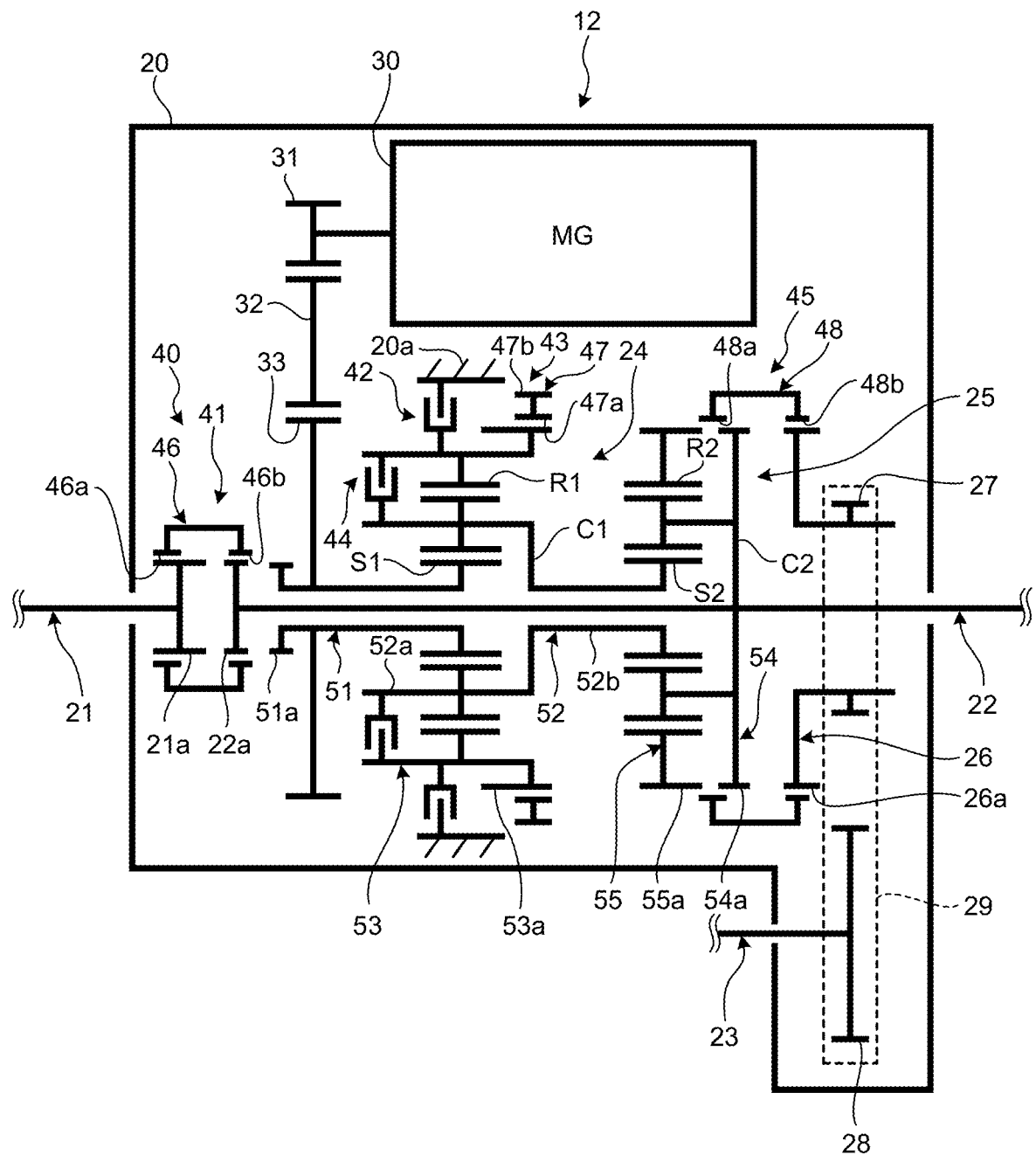
FIG. 8 is a skeleton diagram illustrating a case where the transfer in the first embodiment is in a fifth driving state.
Figure 9:
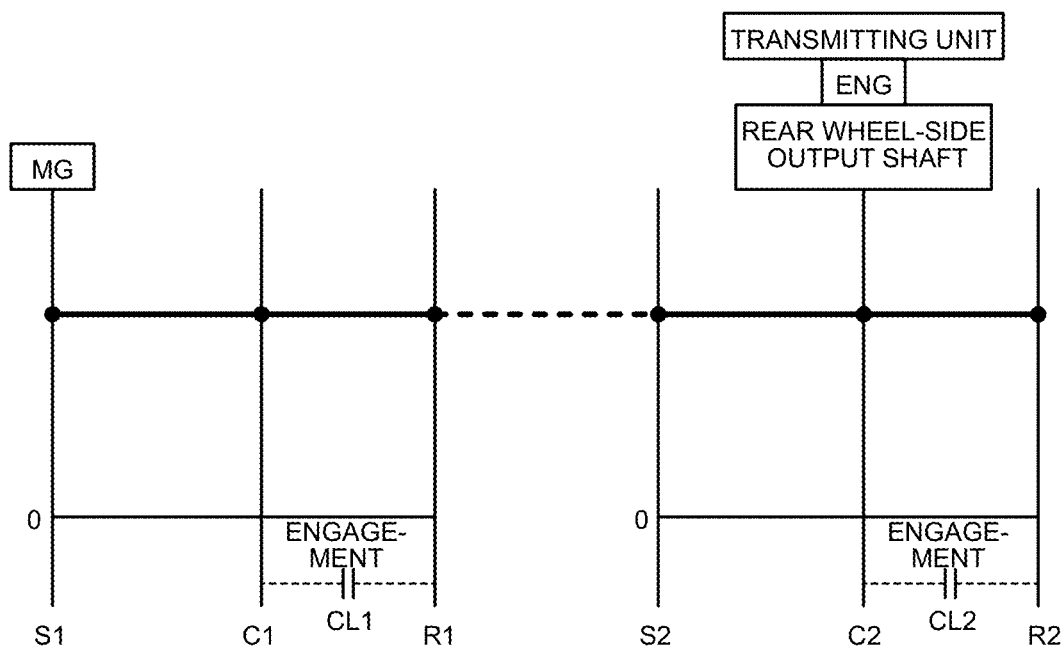
FIG. 9 is a collinear diagram illustrating a relative rotational speed relationship among the rotational elements in each planetary gear device in the fifth driving state.

As illustrated in FIG. 8, in a case where the transfer 12 is in the fifth driving state, the first dog clutch 41 is in the direct coupling state, the second dog clutch 43 is in the non-speed-changing state, and the third dog clutch 45 is in the second distribution state. More specifically, the first switching sleeve 46 meshes with the input shaft 21 and the rear wheel-side output shaft 22. The second switching sleeve 47 does not mesh with the fixing member 20a. Also, the first friction clutch 42 is released and the second friction clutch 44 is engaged. When the third switching sleeve 48 meshes with the fourth rotational member 54, the fifth rotational member 55, and the transmitting unit 26, the second ring gear R2 and the second carrier C2 are coupled to each other in such a manner as to rotate integrally in the second planetary gear device 25, and the second ring gear R2 and the second carrier C2 are coupled to the transmitting unit 26.

In such a manner, since the input shaft 21 is directly coupled to the rear wheel-side output shaft 22 in the fifth driving state, the power of the engine 2 is transmitted to the rear wheel-side output shaft 22 without the first planetary gear device 24 and the second planetary gear device 25. That is, a rotation of the input shaft 21 (rotation of the engine 2) is transmitted to the rear wheel-side output shaft 22 with a speed thereof not being changed. Also, since the first planetary gear device 24 and the second planetary gear device 25 are in the non-speed-changing state in the fifth driving state, when the power of the motor 30 is transmitted to the rear wheel-side output shaft 22 and the front wheel-side output shaft 23, the six rotational elements included in the first planetary gear device 24 and the second planetary gear device 25 have the same rotational speed as illustrated in FIG. 9.

Next, the sixth driving state (case of Lo mode in the third mode) will be described with reference to FIG. 10 and FIG. 11. In the sixth driving state, in the four-wheel driving state in which the connection switching device 40 is in the second distribution state, the first planetary gear device 24 is in the speed-changing state and the second planetary gear device 25 is in the integrally rotating state. In the sixth driving state, a rotation of the engine 2 can be output with the speed thereof being changed (reduced) by the first planetary gear device 24. Furthermore, in the sixth driving state, the rear wheels 4 can be driven by the power of the motor 30 even in the Lo mode.

Figure 10:
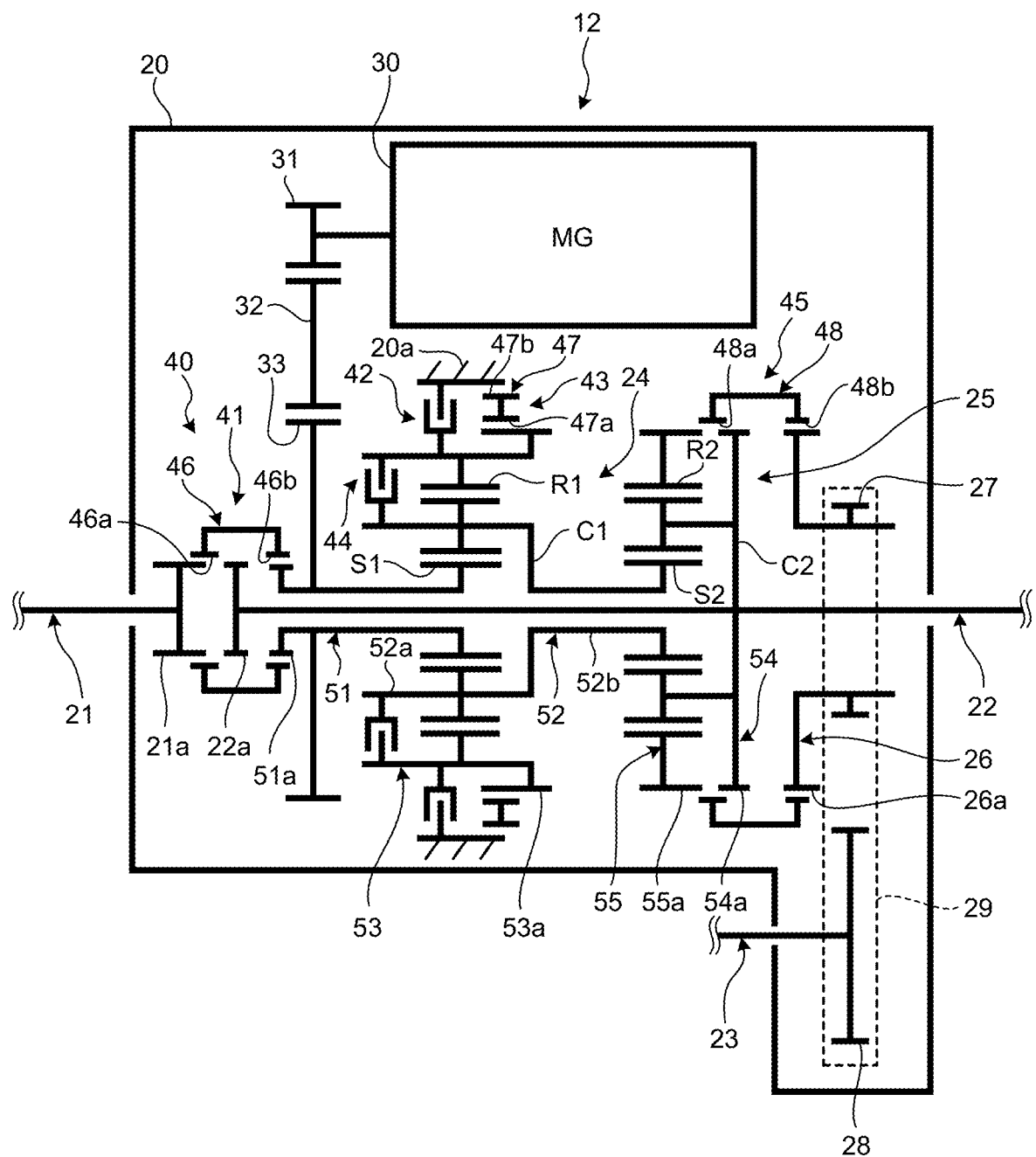
FIG. 10 is a skeleton diagram illustrating a case where the transfer in the first embodiment is in a sixth driving state.
Figure 11:
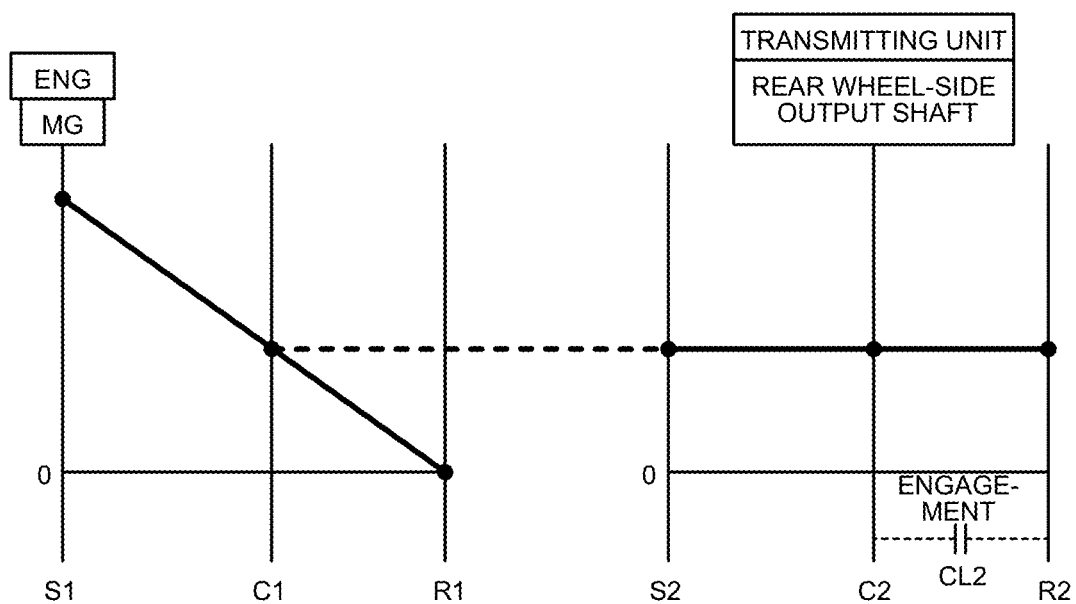
FIG. 11 is a collinear diagram illustrating a relative rotational speed relationship among the rotational elements in each planetary gear device in the sixth driving state.

As illustrated in FIG. 10, in a case where the transfer 12 is in the sixth driving state, the first dog clutch 41 is in the second input state, the second dog clutch 43 is in the speed-changing state, and the third dog clutch 45 is in the second distribution state. More specifically, the first switching sleeve 46 meshes with the input shaft 21 and the first rotational member 51. The second switching sleeve 47 meshes with the fixing member 20a. Also, the first friction clutch 42 is released and the second friction clutch 44 is released. The third switching sleeve 48 meshes with the fourth rotational member 54, the fifth rotational member 55, and the transmitting unit 26. As a result, the second ring gear R2 and the second carrier C2 are coupled to each other in such a manner as to rotate integrally in the second planetary gear device 25, and the second ring gear R2 and the second carrier C2 are coupled to the transmitting unit 26. Furthermore, in the first planetary gear device 24, power input into the first sun gear S1 can be output from the first carrier C1 in a state in which the first ring gear R1 is mechanically fixed.

In such a manner, since the input shaft 21 is coupled to the first rotational member 51 in the sixth driving state, the power of the engine 2 is transmitted to the rear wheel-side output shaft 22 via the first planetary gear device 24 and the second planetary gear device 25. Also, since the first planetary gear device 24 is in the speed-changing state, a rotation of the input shaft 21 (rotation of the engine 2) is transmitted to the rear wheel-side output shaft 22 with the speed thereof being changed by the first planetary gear device 24. Thus, in the sixth driving state, when the power of the motor 30 is transmitted to the rear wheel-side output shaft 22, a rotation of the motor 30 can be transmitted to the rear wheel-side output shaft 22 with the speed thereof being changed by the first planetary gear device 24 as illustrated in FIG. 11.

As described above, with respect to the three rotational elements included in the first planetary gear device 24, the first ring gear R1 fixed to the fixing member 20a and the first sun gear S1 to which the motor 30 is constantly connected are different rotational elements. Thus, the power of the motor 30 can be transmitted to the rear wheel-side output shaft 22 even in the speed-changing state in which the first ring gear R1 is fixed. As a result, in a case where the first planetary gear device 24 is in the speed-changing state, a rotation of the motor 30 can be output with the speed thereof being changed by the first planetary gear device 24, and the power of the engine 2 can be transmitted to the drive wheels with the power of the motor 30 being added thereto.

Also, in the connection state in which the input shaft 21 is directly coupled to the rear wheel-side output shaft 22, a speed reduction ratio applied to the motor 30 can be arbitrarily switched by the first planetary gear device 24.

Note that it is possible to configure a modification example of the above-described first embodiment.

Figure 12:
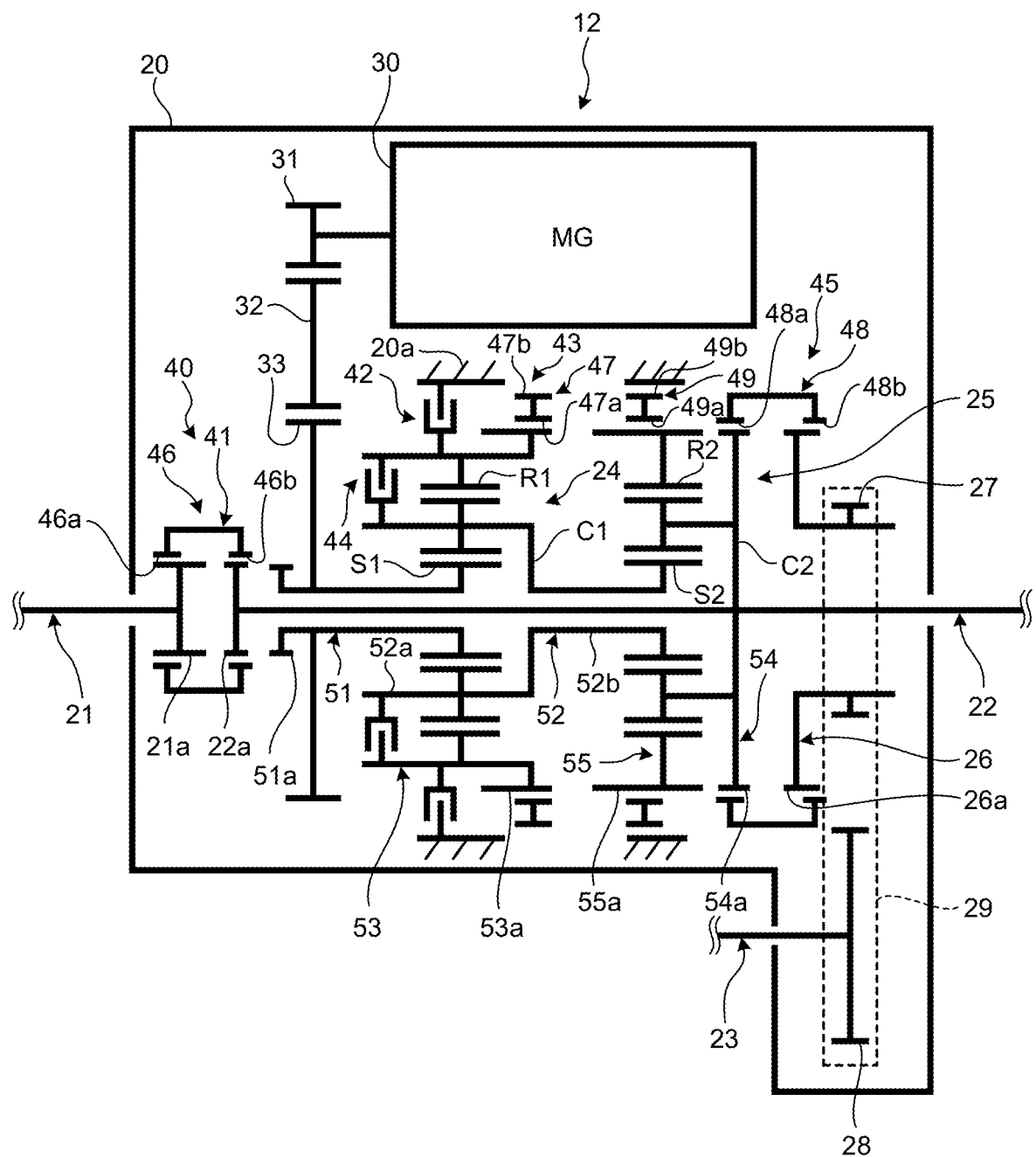
FIG. 12 is a skeleton diagram schematically illustrating a transfer in a modification example of the first embodiment.

For example, as illustrated in FIG. 12, in a transfer 12 of a modification example, a connection switching device 40 includes a fourth dog clutch 49 that selectively fixes a second ring gear R2 of a second planetary gear device 25 to a fixing member 20a. The fourth dog clutch 49 has a switching sleeve as a transmission switching member. The switching sleeve of the fourth dog clutch 49 has a first gear tooth 49a that meshes with a gear tooth 55a of a fifth rotational member 55, and a second gear tooth 49b that meshes with the fixing member 20a. The second ring gear R2 is fixed when the fourth dog clutch 49 is coupled to the fixing member 20a, and the second ring gear R2 functions as a reaction force element in the second planetary gear device 25. In a case where the fourth dog clutch 49 is engaged in such a manner, a third switching sleeve 48 couples a second carrier C2 and a transmitting unit 26. As a result, the second planetary gear device 25 becomes a speed-changing state, and a rotation of a second sun gear S2 can be output from the second carrier C2 with a speed thereof being changed. Also, in a case where the third switching sleeve 48 meshes with a fourth rotational member 54 and a fifth rotational member 55, the fourth dog clutch 49 is in a released state.

Furthermore, a driving state illustrated in FIG. 12 is a seventh driving state in which a first planetary gear device 24 is in the non-speed-changing state and the second planetary gear device 25 is in the speed-changing state in a four-wheel driving state in which the connection switching device 40 is in a distribution state. In the seventh driving state, a rotation of an engine 2 is output with a speed thereof not being reduced by the transfer 12, a power distribution of front and rear wheels is mechanically fixed, and a rotation of a motor 30 is output with a speed thereof being changed by the second planetary gear device 25. Power of the engine 2 is directly transmitted from an input shaft 21 to a rear wheel-side output shaft 22. On the one hand, power of the motor 30 is transmitted to the second planetary gear device 25 in the speed-changing state via the first planetary gear device 24 in the non-speed-changing state. This second planetary gear device 25 is in a state in which the second ring gear R2 functions as a reaction force element by mechanical force.

In such a manner, as a modification example of the transfer 12, the second planetary gear device 25 may be configured to switch between the speed-changing state and the non-speed-changing state. Accordingly, when an output from the first planetary gear device 24 is transmitted to the rear wheel-side output shaft 22 in a driving state other than the above-described third driving state and fourth driving state, speed reduction can be acquired in the second planetary gear device 25 in addition to a speed reduction ratio acquired in the first planetary gear device 24.

Also, as another modification example, in a case where a first planetary gear device 24 is a single pinion type, a combination of an input element, an output element, and a reaction force element is not limited to that of the above-described first embodiment. As an example, a first sun gear S1 may be a first rotational element (input element), a first carrier C1 may be a third rotational element (reaction force element), and a first ring gear R1 may be a second rotational element (output element). Alternatively, a first sun gear S1 may be a third rotational element (reaction force element), a first carrier C1 may be a second rotational element (output element), and a first ring gear R1 may be a first rotational element (input element). Alternatively, a first sun gear S1 may be a second rotational element (output element), a first carrier C1 may be a third rotational element (reaction force element), and a first ring gear R1 may be a first rotational element (input element). In these cases, a first rotational member 51 is integrally attached to a first rotational element that functions as an input element, and a second rotational member 52 is attached to a second rotational element, which functions as an output element, in such a manner as to rotate integrally therewith. Also, a first friction clutch 42 and a second dog clutch 43 are configured to selectively fix a third rotational element to a fixing member 20a.

Also, as another modification example, a first planetary gear device 24 may include a double pinion-type planetary gear device. In a case where the first planetary gear device 24 is the double pinion type, a first sun gear S1 can be a first rotational element (input element), a first ring gear R1 can be a second rotational element (output element), and a first carrier C1 can be a third rotational element (reaction force element). Alternatively, a first sun gear S1 may be a first rotational element (input element), a first ring gear R1 may be a third rotational element (reaction force element), and a first carrier C1 may be a second rotational element (output element). Alternatively, a first sun gear S1 may be a third rotational element (reaction force element), a first ring gear R1 may be a second rotational element (output element), and a first carrier C1 may be a first rotational element (input element). Alternatively, a first sun gear S1 may be a second rotational element (output element), a first ring gear R1 may be a third rotational element (reaction force element), and a first carrier C1 may be a first rotational element (input element).

Also, as another modification example, in a case where a second planetary gear device 25 is a single pinion type, a connection portion 52b of a second rotational member 52 may be coupled to a second ring gear R2. That is, in a case where the second planetary gear device 25 is the single pinion type, the second ring gear R2 may be a fourth rotational element (input element), a second carrier C2 may be a fifth rotational element (output element), and a second sun gear S2 may be a sixth rotational element. In this case, a fifth rotational member 55 is attached to the second sun gear S2 in such a manner as to rotate integrally. The second sun gear S2 is selectively coupled to a transmitting unit 26 by a third dog clutch 45. A third switching sleeve 48 meshes with a first gear tooth 54a of a fourth rotational member 54 that rotates integrally with the second carrier C2, a gear tooth 55a of the fifth rotational member 55 that rotates integrally with the second sun gear S2, and a first gear tooth 26a of the transmitting unit 26.

Also, as another modification example, a second planetary gear device 25 may include a double pinion-type planetary gear device. In a case where the second planetary gear device 25 is the double pinion type, a second sun gear S2 can be a fourth rotational element (input element), a second ring gear R2 can be a fifth rotational element (output element), and a second carrier C2 can be a sixth rotational element. In this case, a fourth rotational member 54 and a rear wheel-side output shaft 22 are coupled to the second ring gear R2 in such a manner as to rotate integrally therewith. A fifth rotational member 55 is coupled to the second carrier C2 in such a manner as to rotate integrally.

Also, as another modification example, in a case where a second planetary gear device 25 is a double pinion type, a connection portion 52b of a second rotational member 52 may be coupled to a second carrier C2. That is, in a case where the second planetary gear device 25 is the double pinion type, the second carrier C2 may be a fourth rotational element (input element), a second ring gear R2 may be a fifth rotational element (output element), and a second sun gear S2 may be a sixth rotational element.

Furthermore, in the above-described first embodiment and each modification example, an engagement device included in a connection switching device 40 is not limited to the above-described combination of a dog clutch and a friction clutch. That is, a connection switching device 40 only needs to realize each kind of required connection, and the number and form (such as dog clutch and friction clutch) thereof can be freely selected. For example, a first dog clutch 41 and a third dog clutch 45 may be friction clutches. A second friction clutch 44 may be a dog clutch. Also, a second dog clutch 43 may not be provided.

Also, a transfer 12 may select a connection state, in which a relationship between a rear wheel-side output shaft 22 and a front wheel-side output shaft 23 is switched, according to front wheel driving force required for torque splitting, motor characteristics and the like. That is, application to a vehicle in which front wheels 3 are main drive wheels and rear wheels 4 are auxiliary drive wheels is also possible. In this case, the above-described rear wheel-side output shaft 22 becomes an output shaft for the front wheels, and the above-described front wheel-side output shaft 23 becomes an output shaft for the rear wheels.

Also, when a first planetary gear device 24 and a second planetary gear device 25 are in an integrally rotating state, a combination of two rotational elements coupled to each other is not specifically limited. For example, in the first planetary gear device 24, a first sun gear S1 and a first carrier C1 may be coupled, or all three rotational elements may be coupled. Also, in the second planetary gear device 25, a second sun gear S2 and a second ring gear R2 may be coupled, or all three rotational elements may be coupled.

Also, in a case where a first planetary gear device 24 is in a speed-changing state, a combination of rotational elements only needs to be a combination in which a speed of an output can be reduced (changed) with respect to an input. Thus, a speed reduction ratio in the first planetary gear device 24 and a rotational direction of an output element are not specifically limited. Note that in the above-described first embodiment, a case where a value of a speed reduction ratio (transmission gear ratio) becomes the largest and a rotational direction of an input element and a rotational direction of an output element do not change has been described with a first sun gear S1 as the input element, a first carrier C1 as the output element, and a first ring gear R1 as a reaction force element.

Also, an arrangement of a motor 30 and presence or absence of speed reduction at the time of connection (such as reduction gear 31), addition of a transmission mechanism to the motor 30 and the like are not specifically limited. Selection can be made arbitrarily according to specifications of a vehicle 1 and a motor 30.

Next, a transfer 12 of a second embodiment will be described with reference to FIG. 13. In the second embodiment, unlike the first embodiment, an input switching unit includes a first dog clutch 41 and a fifth dog clutch 50. Note that in the description of the second embodiment, the same reference signs are used for configurations similar to those of the first embodiment, and a description thereof is omitted.

Figure 13:
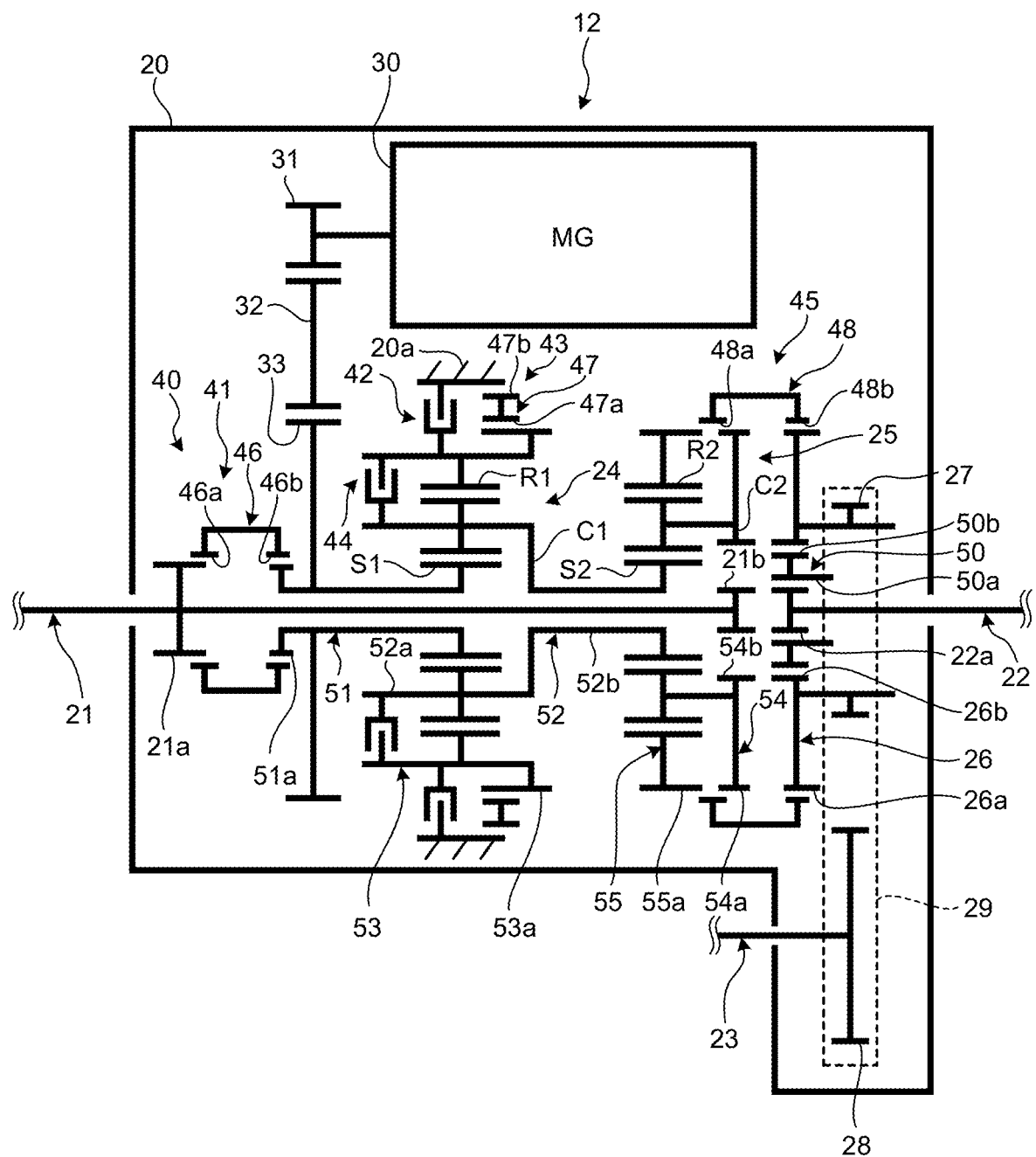
FIG. 13 is a skeleton diagram schematically illustrating a transfer in a second embodiment.

As illustrated in FIG. 13, a connection switching device 40 in the second embodiment includes, as engagement devices to function as input switching units, two clutches that are a first dog clutch 41 and a fifth dog clutch 50. Also, in a second planetary gear device 25, a second carrier C2 is arranged in such a manner as to be rotatable relative to a rear wheel-side output shaft 22. An input shaft 21 and the second carrier C2 are selectively coupled to the rear wheel-side output shaft 22 by the fifth dog clutch 50. This fifth dog clutch 50 switches a connection relationship among the input shaft 21, the rear wheel-side output shaft 22, the second carrier C2, and a transmitting unit 26.

The first dog clutch 41 is switched between a second input state in which the input shaft 21 is coupled to a first sun gear S1 and a disconnection state in which the input shaft 21 is not coupled to the first sun gear S1. When the first dog clutch 41 becomes the second input state, a first gear tooth 46a of a first switching sleeve 46 meshes with a first gear tooth 21a of the input shaft 21, and a second gear tooth 46b thereof meshes with a gear tooth 51a of a first rotational member 51. In a case where the first dog clutch 41 is in the disconnection state, the first switching sleeve 46 does not mesh with the first rotational member 51.

The fifth dog clutch 50 is a meshing engagement device that has a switching sleeve and that selectively couples the input shaft 21 to the rear wheel-side output shaft 22. The switching sleeve included in the fifth dog clutch 50 includes a first gear tooth 50a that meshes with a second gear tooth 21b of the input shaft 21 and a gear tooth 22a of the rear wheel-side output shaft 22, and a second gear tooth 50b that meshes with a second gear tooth 54b of a fourth rotational member 54 or a second gear tooth 26b of the transmitting unit 26.

The fifth dog clutch 50 is switched between a first input state (direct coupling state) in which the input shaft 21 is directly coupled to the rear wheel-side output shaft 22 and the second carrier C2 and the rear wheel-side output shaft 22 are coupled, and a distribution state in which the rear wheel-side output shaft 22 and the transmitting unit 26 are coupled. When the fifth dog clutch 50 is in the first input state, the first gear tooth 50a meshes with the second gear tooth 21b of the input shaft 21 and the gear tooth 22a of the rear wheel-side output shaft 22, and the second gear tooth 50b meshes with the second gear teeth 54b of the fourth rotational member 54. In a case where the fifth dog clutch 50 is in the distribution state, the first gear tooth 50a meshes with the gear tooth 22a of the rear wheel-side output shaft 22, and the second gear tooth 50b meshes with the second gear tooth 26b of the transmitting unit 26.

Also, a driving state illustrated in FIG. 13 is a sixth driving state. In this sixth driving state, the first dog clutch 41 is in the second input state, a first planetary gear device 24 is in a speed-changing state, the second planetary gear device 25 is in an integrally rotating state, a third dog clutch 45 is in a second distribution state, and the fifth dog clutch 50 is in the distribution state.

Next, a transfer 12 of a third embodiment will be described with reference to FIG. 14. In the third embodiment, unlike the first embodiment, a second ring gear R2 of a second planetary gear device 25 is coupled to a rear wheel-side output shaft 22 in such a manner as to integrally rotate therewith. Note that in the description of the second embodiment, the same reference signs are used for configurations similar to those of the first embodiment, and a description thereof is omitted.

Figure 14:
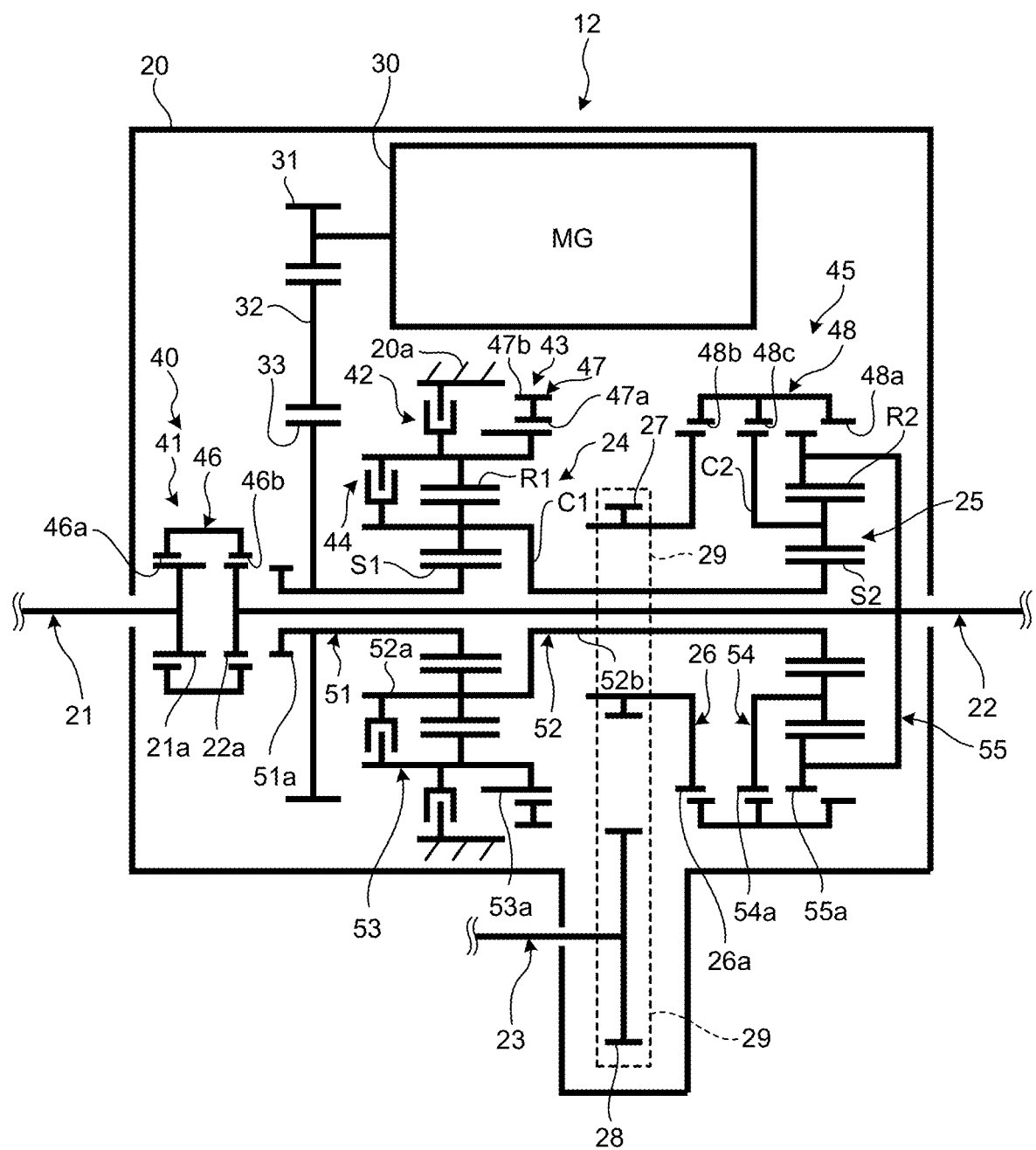
FIG. 14 is a skeleton diagram schematically illustrating a transfer in a third embodiment.

As illustrated in FIG. 14, in the transfer 12 in the third embodiment, a transmitting unit 26, a drive gear 27, and a front-wheel drive chain 29 are arranged between a first planetary gear device 24 and the second planetary gear device 25 arranged side by side in an axial direction. A third switching sleeve 48 of a third dog clutch 45 includes a first gear tooth 48a that meshes with a gear tooth 55a of a fifth rotational member 55, a second gear tooth 48b that meshes with a first gear tooth 26a of the transmitting unit 26, and a third gear tooth 48c that meshes with a first gear tooth 54a of a fourth rotational member 54.

The third switching sleeve 48 is switched between a non-distribution state, a first distribution state, and a second distribution state. In the non-distribution state, the second gear tooth 48b of the third switching sleeve 48 meshes with the fourth rotational member 54, and the third gear tooth 48c meshes with the fifth rotational member 55. As illustrated in FIG. 14, the first distribution state is a state in which the second carrier C2 and the second ring gear R2 can make differential motions and the second carrier C2 is coupled to the transmitting unit 26. In the first distribution state, the second gear tooth 48b meshes with the transmitting unit 26 and the third gear tooth 48c meshes with the fourth rotational member 54 in a state in which the first gear tooth 48a of the third switching sleeve 48 does not mesh with the fifth rotational member 55. In the second distribution state, the first gear tooth 48a of the third switching sleeve 48 meshes with the fifth rotational member 55, the second gear tooth 48b meshes with the transmitting unit 26, and the third gear tooth 48c meshes with the fourth rotational member 54.

In the present disclosure, in a transfer including a motor, a first planetary gear device, and a second planetary gear device, a third rotational element fixed to a fixing member and a first rotational element to which power of the motor is input among three rotational elements included in the first planetary gear device are different rotational elements. Thus, when the first planetary gear device is made to function as a transmission unit in a state in which one rotational element is fixed to a fixing member, power can be transmitted from the motor to drive wheels via this first planetary gear device.

According to an embodiment, in a transfer including a motor, a first planetary gear device, and a second planetary gear device, a third rotational element fixed to a fixing member and a first rotational element to which power of the motor is input among three rotational elements included in the first planetary gear device are different rotational elements. Thus, when the first planetary gear device is made to function as a transmission unit in a state in which one rotational element is fixed to a fixing member, power can be transmitted from the motor to drive wheels via this first planetary gear device.

According to an embodiment, when main drive wheels are driven by the power of the motor, a rotation of the motor can be output with a speed thereof being changed by the first planetary gear device.

According to an embodiment, when the power from the first power source and the power of the motor are transmitted to the main drive wheels and the auxiliary drive wheels, a rotation of the input shaft and a rotation of the motor can be output with speeds thereof being changed by the first planetary gear device.

According to an embodiment, it is also possible to cause the first planetary gear device to function as a transmission unit in a first mode and a second mode. As a result, when the main drive wheels are driven by the power of the motor in a case of the first mode and the second mode, a rotation of the motor can be output with a speed thereof being changed by the first planetary gear device.

According to an embodiment, in a case where a mode becomes the first mode and the main drive wheels are driven, the power from the first power source can be directly transmitted to the first output shaft, and a rotation of the motor can be output with a speed thereof being changed by the first planetary gear device when the power of the motor is transmitted to the first output shaft.

According to an embodiment, in a case where a mode is in the second mode and the main drive wheels and the auxiliary drive wheels are driven, the power from the first power source can be directly transmitted to the first output shaft, and a rotation of the motor can be output with a speed thereof being changed by the first planetary gear device when the power of the motor is transmitted to the first output shaft and the second output shaft.

According to an embodiment, it is possible to cause the first planetary gear device to function as a transmission unit by bringing the first engagement device into the engaged state. Also, by bringing the second engagement device into the engaged state, it is possible to perform switching into a state in which the rotational elements of the first planetary gear device rotate integrally.

According to an embodiment, the distribution switching member is switched among the first distribution state, the second distribution state, and the non-distribution state, whereby the transfer can be switched to a plurality of driving states.

According to an embodiment, in a case of the first mode and the third mode, it is possible to cause the second planetary gear device to function as a transmission unit by bringing the third engagement device into the engaged state. As a result, in a case where the power of the first power source is transmitted to the drive wheels in the third mode, a rotation of the input shaft can be output with a speed thereof being changed by the first planetary gear device and the second planetary gear device.

According to an embodiment, a connection destination of the input shaft can be selectively switched by the input switching member and the first distribution switching member. Also, a case where power can be transmitted to the transmitting unit by first distribution switching member and the second distribution switching member and a case where the power cannot be transmitted can be switched.

According to an embodiment, in a case of the first mode, the power of the first power source can be transmitted to the main drive wheels in a state in which the input shaft is directly coupled to the first output shaft by the first distribution switching member.

According to an embodiment, in a case of the second mode, in a state in which the input shaft is directly coupled to the first output shaft by the first distribution switching member, the power of the motor is transmitted to the second planetary gear device that is in a state of being able to make a differential motion, whereby it is possible to control a distribution of the power transmitted to the main drive wheels and the auxiliary drive wheels.

According to an embodiment, in a case of the third mode, the second distribution switching member brings the second planetary gear device into an integrally rotatable state.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A transfer comprising:
   an input shaft that inputs power from a first power source;
   a motor that functions as a second power source;
   a first output shaft that transmits power to main drive wheels;
   a second output shaft that transmits power to auxiliary drive wheels;
   a first planetary gear device having a first rotational element coupled to the motor, a second rotational element, and a third rotational element;
   a second planetary gear device having a fourth rotational element coupled to the second rotational element, a fifth rotational element, and a sixth rotational element;
   an input switching unit that selectively switches a connection destination of the input shaft;
   the input switching unit that switches a speed-changing state in which a rotation of the first rotational element is output with a speed thereof being changed by the first planetary gear device, and a non-speed-changing state in which a rotation of the first rotational element is output with a speed thereof not being changed by the first planetary gear device; and
   a distribution switching unit that switches a distribution state in which power is transmitted to the first output shaft and the second output shaft, and a non-distribution state in which power is transmitted only to the first output shaft between the first output shaft and the second output shaft, wherein
   connection states of the input shaft, the first planetary gear device, the second planetary gear device, the first output shaft, and the second output shaft can be switched to a plurality of modes by the input switching unit, the transmission switching unit, and the distribution switching unit, and
   the plurality of modes includes
   a first mode in which the input shaft is in a state of being directly coupled to the first output shaft and the distribution switching unit is in the non-distribution state,
   a second mode in which the input shaft is in a state of being directly coupled to the first output shaft, the distribution switching unit is in the distribution state, and the three rotational elements in the second planetary gear device can make differential motions in a state of being respectively coupled to the motor, the first output shaft, and the second output shaft, and
   a third mode in which the input shaft is in a state of being coupled to the first rotational element of the first planetary gear device, the distribution switching unit is in the distribution state, the transmission switching unit is in the speed-changing state in which the third rotational elements are fixed to a fixing member, and the three rotational elements are integrally rotatable in the second planetary gear device in a state in which two rotational elements are coupled to each other and any one of the rotational elements is coupled to the first output shaft.

2. The transfer according to claim 1, wherein
   in a case where the transmission switching unit is in the speed-changing state, a rotation of the motor is output with a speed thereof being changed by the first planetary gear device when the power output from the motor is transmitted to the first output shaft via the first planetary gear device and the second planetary gear device.

3. The transfer according to claim 1, wherein
   in a driving state in the third mode, the power from the first power source and the power of the motor are distributed to the main drive wheels and the auxiliary drive wheels via the first planetary gear device and the second planetary gear device, and a rotation of the input shaft and the rotation of the motor are transmitted to the main drive wheels and the auxiliary drive wheels with speeds thereof being changed by the first planetary gear device.

4. The transfer according to claim 1, wherein
   in the first mode and the second mode, the transmission switching unit can be switched between the speed-changing state and the non-speed-changing state.

5. The transfer according to claim 4, wherein
   in a driving state of a case where the transmission switching unit is in the speed-changing state in the first mode, the power from the first power source is directly transmitted from the input shaft to the first output shaft, the power of the motor is transmitted to the first output shaft via the first planetary gear device and the second planetary gear device, and the power from the first power source and the power of the motor are not transmitted to the second output shaft.

6. The transfer according to claim 4, wherein
   in a driving state of a case where the transmission switching unit is in the speed-changing state in the second mode, the power from the first power source is directly transmitted from the input shaft to the first output shaft, the rotation of the motor is output with the speed thereof being changed by the first planetary gear device when the power of the motor is transmitted to the first output shaft via the first planetary gear device, and the power from the first power source and the power of the motor are distributed to the main drive wheels and the auxiliary drive wheels via the second planetary gear device.

7. The transfer according to claim 1, wherein
   a transmission switching unit includes
   a first engagement device that is switched between an engaged state in which the third rotational element is coupled to the fixing member, and a released state in which the third rotational element is rotatably released, and
   a second engagement device that is switched between an engaged state in which the second rotational element and the third rotational element are integrally rotatably coupled, and a released state in which the second rotational element is released rotatably relative to the third rotational element.

8. The transfer according to claim 1, further comprising
   a transmitting unit that transmits power to the second output shaft, wherein
   the distribution switching unit has a distribution switching member that selectively couples the first output shaft to the transmitting unit,
   the fifth rotational element of the second planetary gear device is integrally rotatably coupled to the first output shaft, and
   the distribution switching member is switched among
   a first distribution state in which the first output shaft is coupled to the transmitting unit and the fifth rotational element and the sixth rotational element are integrally rotatably coupled to each other, a second distribution state in which the first output shaft is coupled to the transmitting unit and the fifth rotational element and the sixth rotational element can make differential motions, and a non-distribution state in which the fifth rotational element and the sixth rotational element are integrally rotatably coupled to each other in a case where the first output shaft is not coupled to the transmitting unit.

9. The transfer according to claim 8, further comprising a third engagement device that is switched between an engaged state in which the sixth rotational element is coupled to a fixing member and a released state in which the sixth rotational element is released rotatably, wherein the third engagement device can be in the engaged state in a case of the first mode and the third mode, and be in the released state in a case of the second mode.

10. The transfer according to claim 1, further comprising a transmitting unit that transmits power to the second output shaft, wherein the input switching unit has an input switching member that selectively couples the input shaft to the first rotational element, the fifth rotational element of the second planetary gear device is rotatable relative to the first output shaft, and the distribution switching unit includes a first distribution switching member that is a member also functioning as the input switching unit, and that selectively couples the input shaft or the transmitting unit to the first output shaft, and a second distribution switching member that selectively couples at least one of the fifth rotational element and the sixth rotational element to the transmitting unit.

11. The transfer according to claim 10, wherein in a case of the first mode, the input switching member does not couple the input shaft to the first rotational element, the first distribution switching member is in a non-distribution state in which the input shaft is directly coupled to the first output shaft without being coupled to the transmitting unit and the fifth rotational element is coupled to the first output shaft, and the second distribution switching member is in a non-distribution state in which the fifth rotational element and the sixth rotational element are integrally rotatably coupled to each other without being coupled to the transmitting unit.

12. The transfer according to claim 10, wherein in a case of the second mode, the input switching member does not couple the input shaft to the first rotational element, the first distribution switching member is in a non-distribution state in which the input shaft is directly coupled to the first output shaft without being coupled to the transmitting unit and the fifth rotational element is coupled to the first output shaft, and the second distribution switching member is in a distribution state in which the sixth rotational element is coupled to the transmitting unit and the fifth rotational element and the sixth rotational element can make differential motions.

13. The transfer according to claim 10, wherein in a case of the third mode, the first distribution switching member is in a distribution state in which the first output shaft is coupled to the transmitting unit without being coupled to the input shaft, and the second distribution switching member is in a distribution state in which the fifth rotational element is coupled to the transmitting unit and the fifth rotational element and the sixth rotational element are integrally rotatably coupled to each other.

* * * * *